US010569222B2

(12) United States Patent
Cohen et al.

(10) Patent No.: US 10,569,222 B2
(45) Date of Patent: Feb. 25, 2020

(54) SYSTEM AND METHOD FOR FLEXIBLE LOW-ENERGY MEMBRANE-BASED LIQUID PURIFICATION

(71) Applicant: THE REGENTS OF THE UNIVERSITY OF CALIFORNIA, Oakland, CA (US)

(72) Inventors: Yoram Cohen, Los Angeles, CA (US); Anditya Rahardianto, Los Angeles, CA (US); Tae Kyung Lee, Van Nuys, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 14 days.

(21) Appl. No.: 15/600,560

(22) Filed: May 19, 2017

(65) Prior Publication Data

US 2017/0334747 A1 Nov. 23, 2017

Related U.S. Application Data

(60) Provisional application No. 62/339,577, filed on May 20, 2016.

(51) Int. Cl.

*B01D 61/02* (2006.01)
*B01D 61/58* (2006.01)

(Continued)

(52) U.S. Cl.

CPC ............ *B01D 61/02* (2013.01); *B01D 61/22* (2013.01); *C02F 1/44* (2013.01); *C02F 1/441* (2013.01);

(Continued)

(58) Field of Classification Search

CPC .... B01D 61/02; B01D 61/022; B01D 61/025; B01D 61/027; B01D 61/06; B01D 61/08;

(Continued)

(56) References Cited

U.S. PATENT DOCUMENTS 4,814,086 A 3/1989 Bratt
4,983,301 A 1/1991 Szucz et al.

(Continued)

OTHER PUBLICATIONS

Dimitriou et al., "Experimental comparison of the performance of two reverse osmosis desalination units equipped with different energy recovery devices", Desalination and Water Treatment, 55 (2015) pp. 3019-3026.

(Continued)

*Primary Examiner* — Pranav N Patel

(74) *Attorney, Agent, or Firm* — Foley & Lardner LLP; Cliff Z. Liu

(57) ABSTRACT

A membrane process unit (MPU) is configured to receive a feed stream, subject the feed stream to membrane purification to generate a product stream and a concentrate stream, and subject the concentrate stream to energy recovery to provide at least a portion of energy for membrane purification. A concentrate recycle unit (CRU) is configured to receive the concentrate stream from the MPU, subject the concentrate stream to flow regulation to generate a waste stream and a recycled concentrate stream, and combine the recycled concentrate stream with a raw feed stream to generate the feed stream which is supplied to the MPU. At least one of a flow rate of the raw feed stream, a flow rate of the waste stream, or a flow rate of the recycled concentrate stream is varied, while each of a flow rate of the feed stream, a flow rate of the product stream, and a flow rate of the concentrate stream is maintained substantially fixed.

12 Claims, 15 Drawing Sheets

(51) Int. Cl.

| | |
|---|---|
| ***C02F 1/44*** | (2006.01) |
| ***B01D 61/22*** | (2006.01) |
| *B01D 61/06* | (2006.01) |
| *B01D 61/18* | (2006.01) |
| *C02F 103/08* | (2006.01) |

(52) U.S. Cl.

CPC .............. *C02F 1/442* (2013.01); *B01D 61/06* (2013.01); *B01D 61/18* (2013.01); *B01D 2311/25* (2013.01); *B01D 2313/246* (2013.01); *B01D 2317/022* (2013.01); *C02F 2103/08* (2013.01); *C02F 2201/009* (2013.01); *C02F 2303/22* (2013.01); *Y02A 20/212* (2018.01); *Y02W 10/37* (2015.05)

(58) Field of Classification Search

CPC ................ B01D 61/10; B01D 2311/08; B01D 2311/14; B01D 2311/24; B01D 2311/26; B01D 2313/246; B01D 2319/022; C02F 1/44; C02F 1/441; C02F 1/442; C02F 2103/08; C02F 2201/009; C02F 2303/22; Y02A 20/212; Y02W 10/37

See application file for complete search history.

(56) References Cited

U.S. PATENT DOCUMENTS

| | | | | |
|---|---|---|---|---|
| 6,797,173 B1 | 9/2004 | Oklejas, Jr. | | |
| 7,628,921 B2 | 12/2009 | Efraty | | |
| 7,695,614 B2 | 4/2010 | Efraty | | |
| 8,025,804 B2 | 9/2011 | Efraty | | |
| 2006/0144789 A1* | 7/2006 | Cath | B01D 61/002 | 210/641 |
| 2012/0061300 A1* | 3/2012 | Matsushiro | B01D 61/022 | 210/137 |
| 2013/0277310 A1* | 10/2013 | Okeljas, Jr. | C02F 1/441 | 210/652 |

OTHER PUBLICATIONS

Dow Water & Process Solutions, FIMTEC Reverse Osmosis, Membranes Technical Manual, Form No. 609-00071-10009, 2014, pp. 1-181.

Gao et al., "Energy-Optimal Control of RO Desalination", Ind. Eng. Chem. Res. 2014, 53, pp. 7409-7420.

Gilron et al., "Prevention of precipitation fouling in NF/RO by reverse flow operation", Desalination 199 (2006) pp. 29-30.

Gray et al., "Seawater Use and Desalination Technology", Treatise on Water Science, vol. 4, 2011, pp. 73-109.

Gu et al., "Self-adaptive feed flow reversal operation of reverse osmosis desalination", Desalination 308 (2013), pp. 63-72.

Huehmer et al., "Evaluation and Optimization of Emerging and Existing Energy Recovery Devices for Desalination and Wastewater Membrane Treatment Plants", Water Reuse Research Foundation Project No. WRT-08-14, 2014, pp. 1-204.

Li et al., "Solar assisted sea water desalination: A review", Renewable and Sustainable Energy Reviews, 19 (2013) pp. 136-163.

Pascaul et al., "Fault Detection and Isolation in a Spiral-Wound Reverse Osmosis (RO) Desalination Plant", Ind. Eng. Chem. Res. 2014, 53, pp. 3257-3271.

Pascual et al., "Data-driven models of steady state and transient operations of spiral-wound RO plant", Desalination 316 (2013) pp. 154-161.

Pomerantz et al., "Prevention of Scaling of Reverse Osmosis Membranes by "Zeroing" the Elapsed Nucleation Time. Part 1. Calcium Sulfate", Ind. Eng. Chem. Res. 2006, 45, pp. 2008-2016.

Zhu et al., "Effect of Thermodynamic Restriction on Energy Cost Optimization of RO Membrane Water Desalination", Ind. Eng. Chem. Res. 2009, 48, pp. 6010-6021.

Zhu et al., "Energy Consumption Optimization of Reverse Osmosis Membrane Water desalination Subject to Feed Salinity Fluctuation", Ind. Eng. Chem. Res. 2009, 48, pp. 9581-9589.

Zhu et al., "Minimization of energy consumption for a two-pass membrane desalination: Effect of energy recovery, membrane rejection and retentate recycling", Journal of Membrane Science 339 (2009), pp. 126-137.

* cited by examiner

SYSTEM AND METHOD FOR FLEXIBLE LOW-ENERGY MEMBRANE-BASED LIQUID PURIFICATION

CROSS-REFERENCE TO RELATED APPLICATION

This application claims the benefit of U.S. Provisional Application No. 62/339,577, filed May 20, 2016, the content of which is incorporated herein by reference in its entirety.

TECHNICAL FIELD

This disclosure generally relates to membrane-based liquid purification and, more particularly, flexible and low-energy membrane-based liquid purification.

BACKGROUND

It is desirable for membrane-based liquid purification systems to have both high operational flexibility and high energy efficiency. However, the objectives of operational flexibility and high energy efficiency can present conflicting design criteria, and it is challenging to simultaneously satisfy both objectives in a single-system platform.

It is against this background that a need arose to develop the embodiments described herein.

SUMMARY

In some embodiments, a liquid purification system includes: 1) a membrane process unit configured to receive a feed stream, subject the feed stream to membrane purification to generate a product stream and a concentrate stream, and subject the concentrate stream to energy recovery to provide at least a portion of energy for membrane purification; and 2) a concentrate recycle unit fluidly connected to the membrane process unit, the concentrate recycle unit configured to receive the concentrate stream from the membrane process unit, subject the concentrate stream to flow regulation to generate a waste stream and a recycled concentrate stream, and combine the recycled concentrate stream with a raw feed stream to generate the feed stream which is supplied to the membrane process unit. The system is configured to vary, in the concentrate recycle unit, at least one of a flow rate of the raw feed stream, a flow rate of the waste stream, or a flow rate of the recycled concentrate stream, while maintaining, in the membrane process unit, each of a flow rate of the feed stream, a flow rate of the product stream, and a flow rate of the concentrate stream substantially fixed.

In some embodiments, the membrane process unit includes a membrane array, a feed pump fluidly connected to the membrane array, and an energy recovery device which is fluidly connected in series or in parallel with the feed pump.

In some embodiments, the membrane process unit includes a reverse osmosis membrane array or a nanofiltration membrane array.

In some embodiments, the membrane process unit includes a membrane process unit controller to direct operation of the membrane process unit.

In some embodiments, the membrane process unit controller is configured to maintain each of the flow rate of the feed stream, the flow rate of the product stream, and the flow rate of the concentrate stream as substantially fixed.

In some embodiments, the concentrate recycle unit includes a concentrate recycle unit controller to direct operation of the concentrate recycle unit.

In some embodiments, the concentrate recycle unit controller is configured to regulate a ratio of the flow rate of the recycled concentrate stream relative to the flow rate of the feed stream entering the membrane process unit in order to achieve and maintain a target steady-state product recovery level of the overall system, specified as a ratio of the flow rate of the product stream relative to the flow rate of the raw feed stream.

In some embodiments, the concentrate recycle unit controller is configured to direct variation of a ratio of the flow rate of the raw feed stream relative to the flow rate of the feed stream within a range of values equal to or smaller than unity. The ratio can be varied on the basis of various parameters, including, but not limited to, time, feed water salinity, feed water fouling/scaling potential, target water recovery, membrane feed pressure, membrane retentate concentration, real-time water permeate production demand, real-time energy consumption, detected/suspected membrane fouling/scaling conditions, or a combination of two or more thereof. In some embodiments, the concentrate recycle unit controller is configured to direct the variation with time in a step-wise or a cyclical manner. In some embodiments, the concentrate recycle unit controller is configured to maintain the flow rate of the feed stream in the membrane process unit as substantially fixed.

In some embodiments, the concentrate recycle unit controller is configured to direct operation of the concentrate recycle unit in multiple cycles each including a solute accumulation period and a solute decumulation period, the concentrate recycle unit controller is configured to increase the flow rate of the recycled concentrate stream during the solute accumulation period, and the concentrate recycle unit controller is configured to decrease the flow rate of the recycled concentrate stream during the solute decumulation period. In some embodiments, for an initial cycle, the solute decumulation period has a duration, and the concentrate recycle unit controller is configured to vary the duration of the solute decumulation period to provide optimal solute purging from the system while minimizing or reducing a volume of the raw feed stream for solute purging in at least one subsequent cycle.

In some embodiments, an integration of the membrane process unit, including an energy recovery device, with the concentrate recycle unit provides a single-system platform to operate at varying raw feed solute concentrations with an upper value of solute concentration and a product recovery level set by pressure ratings of system components.

In some embodiments, a liquid purification method includes: 1) operating a membrane process unit by receiving a feed stream, subjecting the feed stream to membrane purification to generate a product stream and a concentrate stream, and subjecting the concentrate stream to energy recovery to provide at least a portion of energy for membrane purification; and 2) operating a concentrate recycle unit by receiving the concentrate stream from the membrane process unit, subjecting the concentrate stream to flow regulation to generate a waste stream and a recycled concentrate stream, and combining the recycled concentrate stream with a raw feed stream to generate the feed stream which is supplied to the membrane process unit. The method further includes varying at least one of a flow rate of the raw feed stream, a flow rate of the waste stream, or a flow rate of the recycled concentrate stream in the concentrate recycle unit, while maintaining each of a flow rate of the feed stream, a flow rate of the product stream, and a flow rate of the concentrate stream in the membrane process unit substantially fixed.

In some embodiments, operating the concentrate recycle unit includes regulating a ratio of the flow rate of the recycled concentrate stream relative to the flow rate of the feed stream entering the membrane process unit in order to achieve and maintain a target steady-state product recovery level of an overall system.

In some embodiments, operating the concentrate recycle unit includes varying a ratio of the flow rate of the raw feed stream relative to the flow rate of the feed stream within a range of values equal to or smaller than unity. The ratio can be varied on the basis of various parameters, including, but not limited to, time, feed water salinity, feed water fouling/scaling potential, target water recovery, membrane feed pressure, membrane retentate concentration, real-time water permeate production demand, real-time energy consumption, detected/suspected membrane fouling/scaling conditions, or a combination of two or more thereof. In some embodiments, the ratio of the flow rate of the raw feed stream relative to the flow rate of the feed stream is varied with time in a step-wise or a cyclical manner.

In some embodiments, operating the concentrate recycle unit includes performing multiple cycles each including a solute accumulation period and a solute decumulation period, the flow rate of the raw feed stream is reduced during the solute accumulation period, and the flow rate of the raw feed stream is increased during the solute decumulation period. In some embodiments, operating the concentrate recycle unit includes adjusting a duration of the solute decumulation period in real-time, by varying the duration of the solute decumulation period across the cycles.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DETAILED DESCRIPTION

Overview

Figure 1:
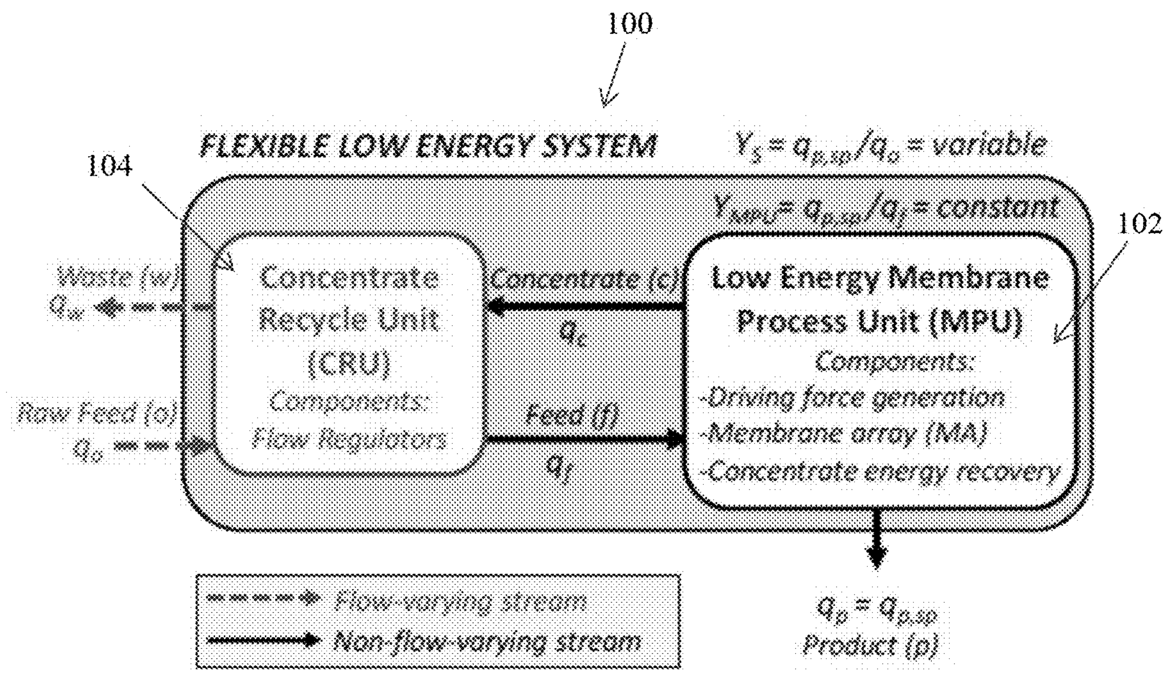
FIG. 1. Illustration of a system and a method according to some embodiments. In regulating a product recovery level of the system ($Y_S$), flow rates of flow-varying streams in a concentrate recycle unit (CRU) can be adjusted, while all flow rates and a product recovery level ($Y_{MPU}$) in a membrane process unit (MPU) remain substantially constant. For low-energy operation, the MPU integrates concentrate energy recovery in addition to optimal operation of a driving force generation component and a membrane array.

Embodiments of a single-system platform and method for combined flexible and low-energy membrane-based liquid purification are provided. Some embodiments are based on a finding that enhanced operational flexibility can be optimally combined with high energy efficiency within a single-system platform. In some embodiments, this combination can be attained by decoupling a process system into separate but connected flow-varying and non-flow-varying major process operations. Specifically, the single-system platform comprises of a fluidly-connected membrane process unit (MPU) for liquid purification and a concentrate recycle unit (CRU) for adjusting a system product recovery level. The MPU further comprises fluidly-connected components for generating a driving force for liquid purification (e.g., one or more pumps), a membrane arrangement or array, and an energy recovery device. The CRU further comprises components for flow regulation (e.g., one or more valves) and hydraulic conduits or lines for flow splitting and mixing.

In some embodiments, an operational method in the MPU comprises supplying MPU feed from the CRU; generating a driving force (e.g., a transmembrane pressure); splitting the feed into a solute-poor product and a solute-rich concentrate using the membrane arrangement; providing an energy recovery device; and maintaining all flow rates substantially constant in the MPU. In some embodiments, an operation method in the CRU comprising receiving the solute-rich concentrate from the MPU; splitting the solute-rich concentrate into waste and a recycled concentrate; supplying a solute-containing raw feed into the CRU; mixing the raw feed with the recycled concentrate for the MPU feed; regulating the recycled concentrate flow rate; and maintaining the MPU feed flow rate substantially constant. The integrated MPU-CRU system can be operated in a steady-state mode at a given system product recovery level, specified as a ratio of product flow rate to the raw feed flow rate. The system product water recovery level can be varied from one steady-state value to another; this is attained by regulating a recycled concentrate flow rate in the CRU while maintaining all flow rates substantially constant in the MPU.

In some embodiments, the MPU-CRU system can also be operated in a cyclic unsteady-state mode in which an instantaneous system product recovery level is shifted alternatingly between an upper value and a lower value to achieve alternating solute accumulation and purging periods in a cyclical manner. A process control approach is provided in which a MPU controller objective is to maintain substantially constant flow rates in the MPU, while a CRU controller objective is to adjust the system product recovery level to appropriate values based on raw feed solute concentration and other system conditions.

Objectives

Some embodiments are directed to a single-system platform and method for membrane-based liquid purification such as, but not limited to, ultrafiltration, nanofiltration, and reverse osmosis, as well as membrane distillation and forward osmosis. In some embodiments, a system 100 (see FIG. 1) comprises fluidly-connected components that include an array 200 of membrane modules MM (see FIG. 2), components for generating a driving force (e.g., one or more of a pump, a heater, an osmotic draw solution, and so forth) for liquid flow and for liquid separation, an energy recovery device (e.g., one or more of a pressure exchanger, a heat exchanger, and so forth), and flow regulation components (e.g., one or more valves), connected with components for system monitoring and control (e.g., one or more sensors and actuators). The function of the system 100 is to generate a purified (solute-poor) liquid product stream at a specified target production level. This is attained by separating an inlet stream of raw feed (of a given solute concentration) using solute-rejecting membranes. A liquid fraction that passes through the membranes is the product stream, while a remaining rejected liquid fraction leaves the system 100 as a concentrated (solute-rich) waste stream.

Some embodiments are directed to a single-system platform for membrane-based liquid purification that can operate effectively and energy-efficiently over a wide range of system product recovery levels ($Y_s=q_p/q_o$ where $q_p$ and $q_o$ are product and raw feed flow rates). To achieve this goal, some, or all, of the following objectives should be met simultaneously:

1). Effective operation within the membrane array design limits. The membrane array design (e.g., type, number, and configuration of membrane modules in the array; see FIG. 2) places a constraint on an operational range (e.g., stream flow rates, membrane permeate flux, pressure, and so forth) of the system 100. To operate effectively, the system 100 should maintain productivity at a target set-point ($q_{p,sp}$) while retaining values of other operational parameters within the membrane array design limits. Typically, design limits are placed for effective utilization of membrane modules (e.g., to minimize number of modules), while avoiding operating conditions that can endanger membrane module physical integrity (against over-pressurization or over-flow), cause excessive concentration polarization, or lead to rapid accumulation of unwanted materials on membrane surfaces (e.g., membrane fouling or mineral scaling). The following basic criteria should be met to achieve objective 1):

a) a product volumetric flow rate maintained at the desired design set-point ($q_p=q_{p,sp}$),
b) an average permeate flux ($\bar{J}_v=q_p/a_M$, where $a_M$ is a total active membrane area) within the allowable design range ($\bar{J}_{v,min}\leq\bar{J}_v\leq\bar{J}_{v,max}$). This constraints the average per element product recovery ($\bar{Y}_{E,min}\leq\bar{Y}_E\leq\bar{Y}_{E,max}$) and also imposes a minimum on the number of serially-arranged membrane modules to achieve a target recovery in the membrane array MA ($N=\ln(1-Y_{MA})/\ln(1-\bar{Y}_E)$),
c) a concentrate volumetric flow rate exiting the membrane array at or above a minimum design limit ($q_c\geq q_{c,min}$), and
d) a feed volumetric flow rate entering the membrane array at or below a maximum design limit ($q_f\leq q_{f,max}$).

2). Energy-optimal operation of process components. Aside from system operating conditions (e.g., system product recovery level), energy efficiency of each process component (e.g., pumps, energy recovery device, membrane array, and so forth) can have an impact on an overall system energy consumption. It is desired to ensure that each process component is operated at or near its best efficiency point. Thus, achieving objective 2) involves:

a) operation of components for driving force generation (e.g., pumps) substantially at their energy-optimal design flow rates (e.g., at best efficiency points),
b) integration of an energy recovery device and its operation substantially at energy-optimal design flow rates, and
c) membrane array design that allows system operation close to the thermodynamic limit.

3). Operational flexibility. Solute concentration levels in the membrane array govern the thermodynamic minimum energy input for liquid purification, as well as the possibility for and rate of membrane fouling/mineral scaling. The solute concentration levels in the membrane array are governed by the system product recovery level ($Y_S$). To maintain system energy-optimality and avoid crippling membrane fouling/mineral scaling episodes, the steady-state $Y_S$ should be regulated to adapt to the variability in raw feed solute concentration. Another method for controlling membrane fouling/mineral scaling is to temporally vary the solute concentrations in the membrane array in a controlled, cyclical manner. This can be achieved, for example, by shifting the system product recovery level $Y_S$ between two different values. Meeting objective 3) involves capabilities for:

a) flexible regulation of the system product recovery level ($Y_S$) over a wide range, and
b) on-demand switching between steady-state and cyclic unsteady-state operational modes without requiring a break in production.

The conflicting criteria of objectives 1)-2) with that of objective 3) is a challenge for achieving objectives 1)-3) simultaneously in a single-system platform for membrane-based liquid purification. This is because process variables that should be maintained at optimal values are highly coupled with system product recovery. Specifically, criteria of objectives 1)-2) imply that process components in the system 100 should operate at fixed or narrow flow ranges per system design. In turn, the limits on flow rates impose a restriction on the ability to vary a product recovery of a MPU 102 ($Y_{MPU}=q_{p,sp}/q_f$, where $q_{p,sp}$ and $q_f$ are the product set-point and feed flow rates of the membrane array; see FIGS. 1 and 2). For example, in most membrane-based systems, the membrane array feed flow rate is typically equal to that of the raw feed (e.g., $q_f=q_o$). In such a case, flexible regulation of system product recovery ($Y_S$, which in this case corresponds to $Y_{MPU}$) is not feasible when constrained by objectives 1)-2), rendering objective 3) difficult to achieve using other approaches.

Figure 2:
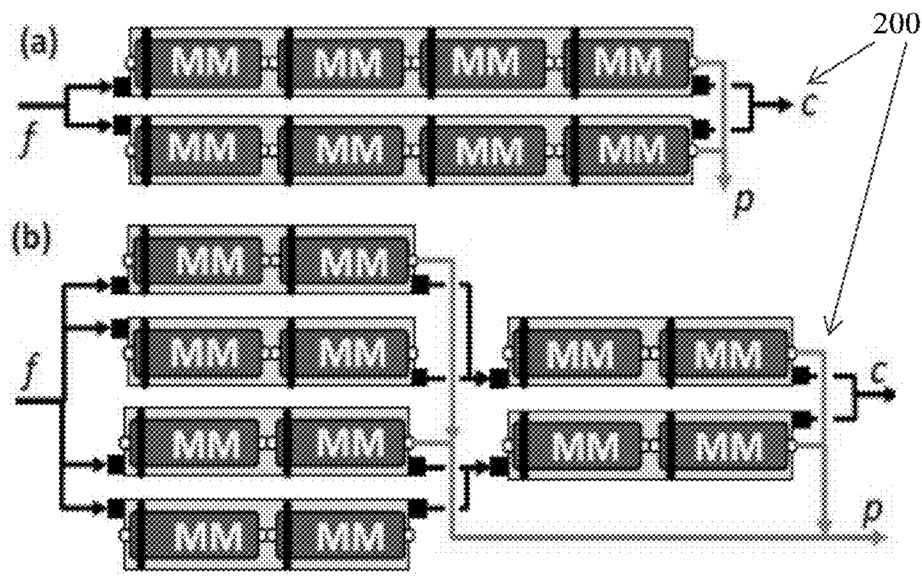
FIG. 2. Examples of membrane arrays with four membrane modules MM in series: (a) a single array design, and (b) a 2:1 array design. Inlet/outlet streams are feed (f), concentrate (c), and product (p).

Embodiments of this disclosure overcome the above challenge with the finding that a single-system platform for flexible low-energy membrane-based purification can be implemented by decomposing the process system into two separate but connected process units dedicated for: a) low-energy liquid purification, and b) flow regulation (FIG. 1), thereby decoupling process variables that should be maintained substantially constant (to achieve objectives 1)-2)) with those that should be varied in order to regulate system product recovery (objective 3)). The primary function of the MPU 102 is energy-optimal generation of the product stream at a target flow rate ($q_p=q_{p,sp}$). The MPU components (e.g., membrane array, driving force generation component, and energy recovery device) are designed and integrated so that the feed flow rate ($q_f$), concentrate flow rate ($q_c$), and thus product recovery level ($Y_{MPU}=q_p/q_f$) remain substantially fixed at optimal values for effective system operation within equipment design limits (objective 1)) and for maximum energy efficiency (objective 2)). A CRU 104, which provides feed ($q_f$) to and receives concentrate ($q_c$) from the MPU 102, controls the overall system product recovery ($Y_S=q_p/q_o$) by regulating the system inlet flow of raw feed ($q_o$) and system outlet flow of waste ($q_w$). In the CRU 104, the system outlet waste flow ($q_w$) is taken from a portion of the MPU concentrate ($q_c$). The remaining portion is a concentrate recycle stream ($q_{rc}$), which is mixed in the CRU 104 with the system inlet raw feed stream ($q_o$) to generate the membrane array feed stream ($q_f$). By regulating the recycled concentrate flow rate ($q_{rc}$) and keeping the MPU feed flow rate fixed ($q_f=q_o+q_{rc}$), the incoming raw feed flow rate ($q_o$) and thus the system product recovery ($Y_S=q_p/q_o$) can be varied in a flexible manner without changing the flow rates of any streams in the MPU 102 (FIG. 1). Thus, process decomposition into the CRU 104 for flow regulation and the MPU 102 for liquid purification, respectively, allows a single-system platform to achieve objectives 1)-3) simultaneously.

Manner of Implementation

Figure 3:
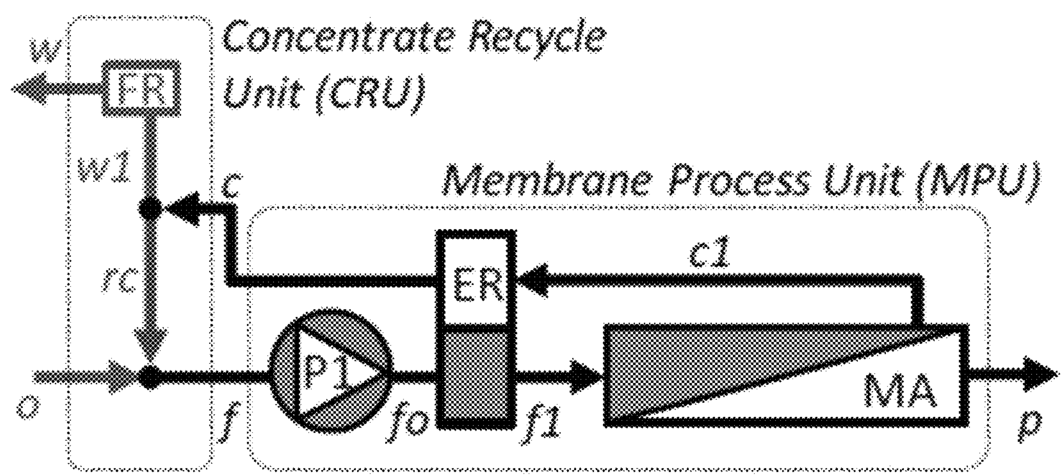
FIG. 3. An embodiment of a Flexible Low-Energy Reverse Osmosis (FLERO) system, composed of a CRU and a MPU. The MPU is equipped with an energy recovery device (ER) configured in series after a feed pump (P1). A flow regulator (FR) in the CRU regulates a fraction of a concentrate stream that is recycled into a membrane array (MA) in the MPU. Streams: o-raw feed, f-feed, c-concentrate, p-permeate, w-concentrate waste, rc-recycled concentrate.
Figure 4:
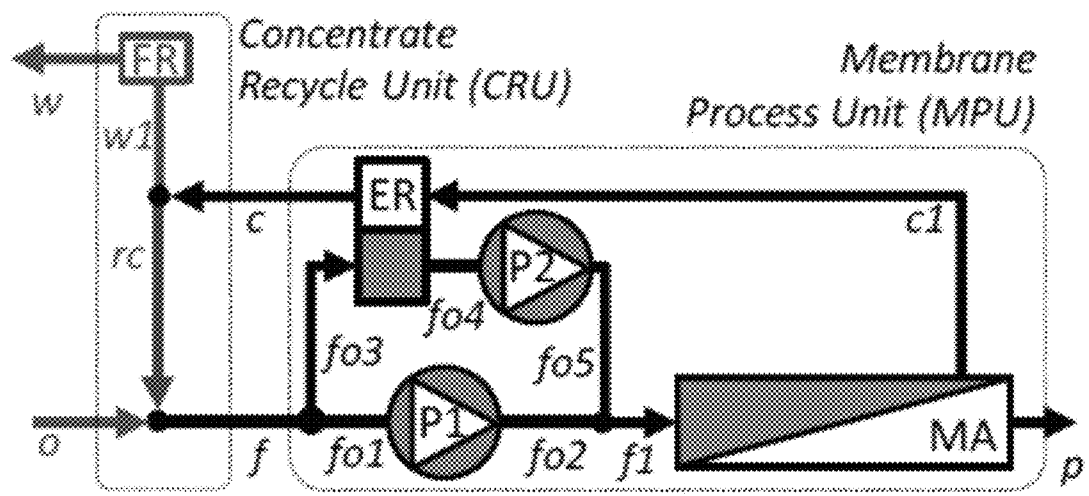
FIG. 4. An embodiment of a FLERO system with an energy recovery device (ER) installed in parallel with a main feed pump (P1). A feed booster pump (P2) is included in this configuration.

In some embodiments, a system platform can be applied to a reverse osmosis process to devise a Flexible Low-Energy Reverse Osmosis (FLERO) system platform and method. In a FLERO system, a MPU is composed of a pump, a membrane array, and an energy recovery device. In the FLERO system, a CRU is composed of a flow splitting device where a concentrate (c) stream is split into recycled concentrate (rc) and waste (w1) streams, a flow mixing device where the recycled concentrate (rc) stream is mixed with a raw feed (o) stream, and a flow regulator that controls a portion of the recycled concentrate (rc) from the MPU that is recycled into a feed (f) relative to a portion that exits the system as waste (w). In an embodiment of the FLERO system illustrated in FIG. 3, the energy recovery device (ER) in the MPU is configured with its feed-side positioned in series downstream of the feed pump (P1) and upstream of the membrane array (MA). With the feed pre-pressurized by P1 (from a pressure $P_f$ to $P_{fo}$), the function of the ER is to recover energy from the concentrate stream (thus depressurizing the MA concentrate from $P_{c1}$ to $P_c$) in order to intensify the pressure (e.g., from $P_{fo}$ to $P_{f1}$) of the MA feed to a level for achieving the product flow set-point in the MA. Suitable ER devices for this case include, but are not limited to, pressure intensifiers (such as the Clark Pump) and turbochargers. Some energy recovery devices such as pressure exchangers can operate in parallel with the main feed pump (P1) as depicted in a MRU of another FLERO embodiment shown in FIG. 4. In this case, a booster pump (P2) downstream of the feed-side ER is included. Both ER-P2 and P1 should provide substantially the same level of feed pressurization (e.g., $P_{f1}-P_f=P_{fo5}-P_{fo3}=P_{fo2}-P_{fo1}$) for achieving the product flow set-point in the MA.

Figure 5:
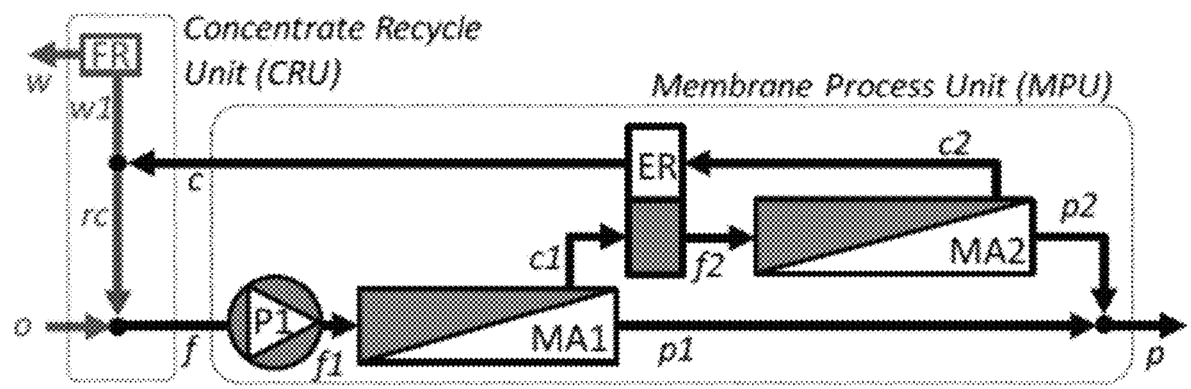
FIG. 5. An embodiment of a FLERO system with an energy recovery device (ER) installed as an inter-stage pressure booster between a first-stage membrane array (MA1) and a second-stage membrane array (MA2). A flow regulator (FR) regulates a fraction of a concentrate that is recycled into a feed. Streams: o-raw feed, f-membrane feed, c-concentrate, p-permeate, w-waste, rc-recycled concentrate.

A FLERO system can also include multiple membrane arrays arranged in multiple pressurization stages. As shown in FIG. 5, a two-stage FLERO system utilizes a feed pump (P1) to generate a requisite pressure for a first-stage membrane array (MA). An energy recovery device (ER) is utilized as an intermediate stage pressure booster to generate a pressure for a second-stage MA by recovering energy from its concentrate. In the embodiments shown in FIGS. 3-5, the CRUs can be identical; a single flow regulator (FR, e.g., a valve) is utilized to control the flow rate of the waste stream ($q_w$), thereby providing an indirect control of the concentrate recycle stream. In the above embodiments, an optional backflow preventer may be beneficial in the "rc" stream for safety. Alternatively, a three-way directional valve placed at the MPU concentrate splitting point (e.g., between "rc" and "w1") or other flow splitting and regulation component may be used in place of the FR.

Figure 6:
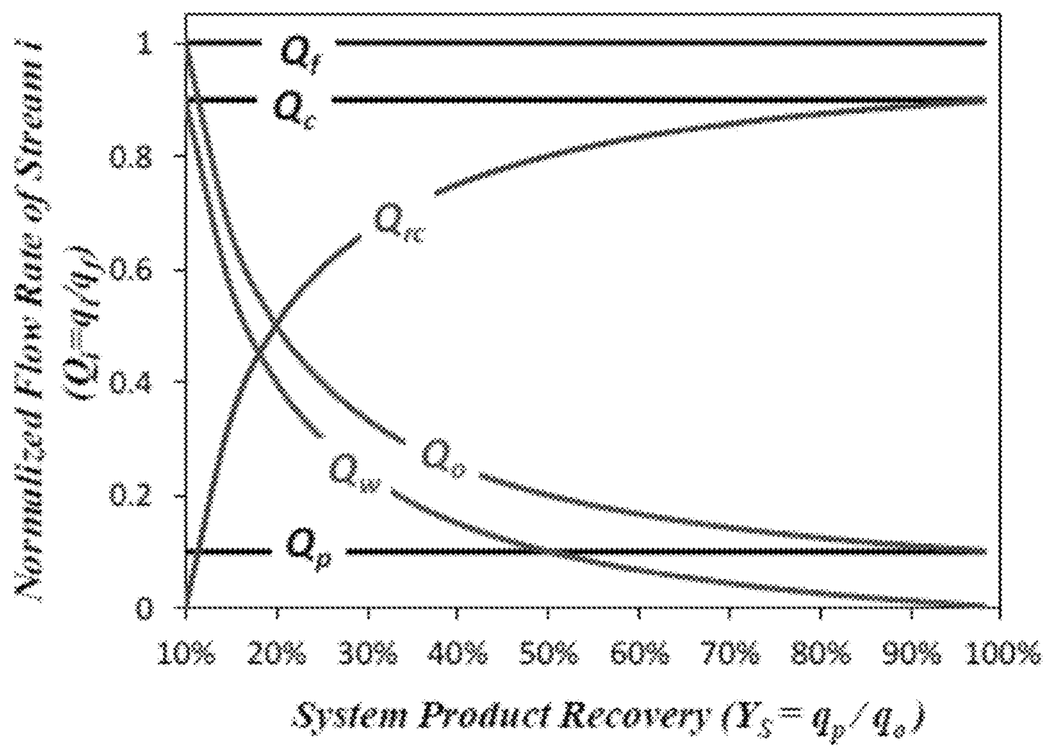
FIG. 6. Variation of flow rates (normalized with respect to membrane feed flow rate, $q_f$) of major fluid streams with overall system product recovery ($Y_S=q_p/q_o$), illustrating the steady-state operating approach of a FLERO system (e.g., FIGS. 3-5) for adjusting system product water recovery ($Y_S$). A membrane array product recovery ($Y_{MPU}=q_p/q_f$), which is set at about 10% for this specific example, specifies the minimum system water recovery ($Y_S$). Streams: o-system raw feed, f-feed, c-concentrate, p-permeate, w-concentrate waste, rc-recycled concentrate. Flow rates are calculated based on flow balance.

Embodiments of the FLERO system described above (and shown in FIGS. 3-5) are some examples of various embodiments of the system. Despite certain differences in some embodiments, a common unifying feature is that a process in the FLERO system can be decomposed into a non-flow-varying MPU and a flow-varying CRU. A non-flow-varying MPU allows for pumps, an energy recovery device, and a membrane array to be optimally selected and operated at their fixed design flow rates (and thus meet objectives 1)-2)). The flow-varying CRU provides the capability for regulating the steady-state system product recovery by way of the recycled concentrate flow rate (meeting objective 3)), which follows the equation below:

$$Y_S = \frac{Y_{MPU}}{1 - Q_{rc}} \tag{1.1}$$

where $Y_{MPU}$ is substantially fixed at the optimal level for a specific MA design (e.g., a FLERO MPU specification) and $Q_{rc}$ is a dimensionless recycled concentrate flow rate. Note that a dimensionless flow rate i is specified with respect to the MPU feed flow ($Q_i \equiv q_i/q_f$). Given the above, various FLERO systems can share a basic steady-state operational method, which is illustrated in FIG. 6. Specifically, the steady-state system product recovery ($Y_S=Q_p/Q_o$) can be varied (from one steady-state value to another) by controlling the (dimensionless) recycled concentrate flow rate. As the MPU is by design a non-varying-flow unit, the dimensionless feed ($Q_f=1$), concentrate ($Q_c$), and product ($Q_p$) flow rates are kept substantially constant with changing $Y_S$. The MPU product recovery level ($Y_{MPU}$) is therefore substantially constant, imposing a minimum on the system recovery ($Y_S \geq Y_{MPU}$). The steady-state $Y_S$ can be increased above the minimum value through the CRU by decreasing the raw inlet feed flow rate ($Q_o$). Because the MPU feed ($Q_f=Q_o+Q_{rc}$) is maintained substantially constant, decreasing $Q_o$ can be accomplished by increasing $Q_{rc}$.

Figure 7:
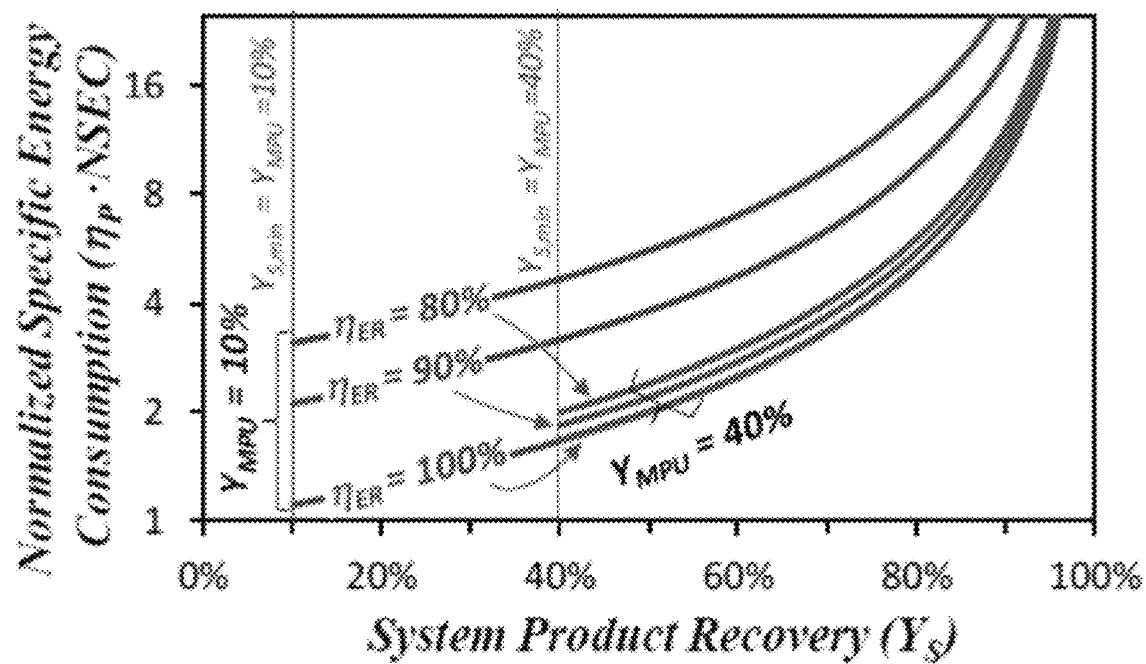
FIG. 7. Variation of normalized specific energy consumption (NSEC) as a function of system product recovery ($Y_S$) and energy recovery device efficiency ($\eta_{ER}$) for MPU product recovery $Y_{MPU}$ of 10% and 40%. The NSEC calculation is for MPU operation at the limit of thermodynamic restriction.

In a FLERO system, the integration of a non-flow-varying MPU with a flow-varying CRU leads to a highly flexible system (objective 3)) that allows for effective membrane operation within the system's design limits (objective 1)) and at energy-optimal conditions (objective 2)). An aspect of the FLERO approach is the ability to optimally integrate and operate an energy recovery device, while maintaining high system operational flexibility. The energy recovery device in FLERO system serves two main purposes: a) to significantly reduce the system's energy footprint by recovering the pressure energy in a MPU concentrate for partial pressurization of a MPU feed and, at the same time, b) to depressurize the MPU concentrate, allowing for concentrate recycling in the CRU with reduced pressure energy loss. The energy footprint can be quantified by the specific energy consumption (SEC=energy consumed/product flow rate), normalized by the raw feed osmotic pressure (NSEC=SEC/$\pi_o$). For the FLERO embodiment shown in FIG. 3 (which has a single pumping stage), the NSEC is given by:

$$NSEC_{tr} = \frac{q_f \cdot p_{f1}}{\eta_p \cdot q_p \cdot \pi_o} \tag{1.2}$$

where $\eta_P$ is the pump (P1) efficiency. It can be shown from energy balance that NSEC of this FLERO system, with a membrane of substantially complete salt rejection, operating at the limit of thermodynamic restriction (tr) is a function of $Y_{MPU}$ and $Y_S$ as given by:

$$NSEC_{tr} = \frac{1 - \eta_{ER} \cdot (1 - Y_{MPU})}{\eta_p \cdot Y_{MPU} \cdot (1 - Y_S)} \tag{1.3}$$

where $\eta_{ER}$ is the energy recovery efficiency. As shown in FIG. 7, a lower $Y_{MPU}$ (e.g., lower limit of $Y_S$) leads to a wider range of $Y_S$ (and thus more flexible system) but at the cost of larger energy footprint. It is also evident from FIG. 7 that NSEC can be rather sensitive to the energy recovery device efficiency, especially when $Y_{MPU}$ is low. At the limit of complete energy recovery ($\eta_{ER} \rightarrow 1$), with a membrane of substantially complete salt rejection, the NSEC of FLERO becomes independent of $Y_{MPU}$:

$$NSEC_{tr} = \frac{1}{\eta_p \cdot (1 - Y_S)} \tag{1.4}$$

Note that Eq. 1.4 corresponds to the lowest NSEC that is possible for a reverse osmosis process with a single pumping stage and complete concentrate energy recovery. Thus, in principle, the FLERO approach, at the limit of $\eta_{ER} \rightarrow 1$, allows for operation at the lowest possible SEC for a reverse osmosis process of the same number of membrane array pumping stage without sacrificing operational flexibility. Thus, optimal integration of energy recovery devices and their operation at the maximum efficiency are therefore desired in FLERO systems.

Figure 8:
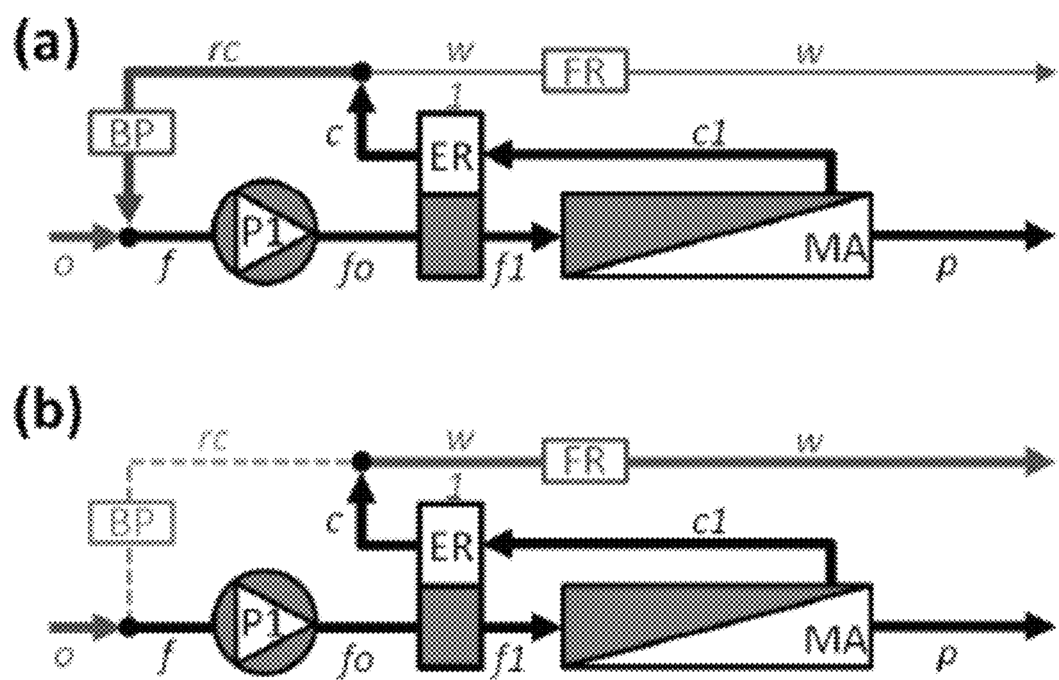
FIG. 8. Diagrams depicting two switching configurations during cyclic operation in a FLERO system of FIG. 3. (a) solute accumulation (where $q_{rc}>0$ and $q_c\geq 0$ and (b) solute decumulation (where $q_{rc}\approx 0$). Components: P1—feed pump, MA—membrane array, ER—energy recovery device, FR—flow regulator, BP—backflow preventer. Streams: o—raw feed, f—membrane feed, c—concentrate, p—permeate, b—brine waste, rc—recycled concentrate.
Figure 9:
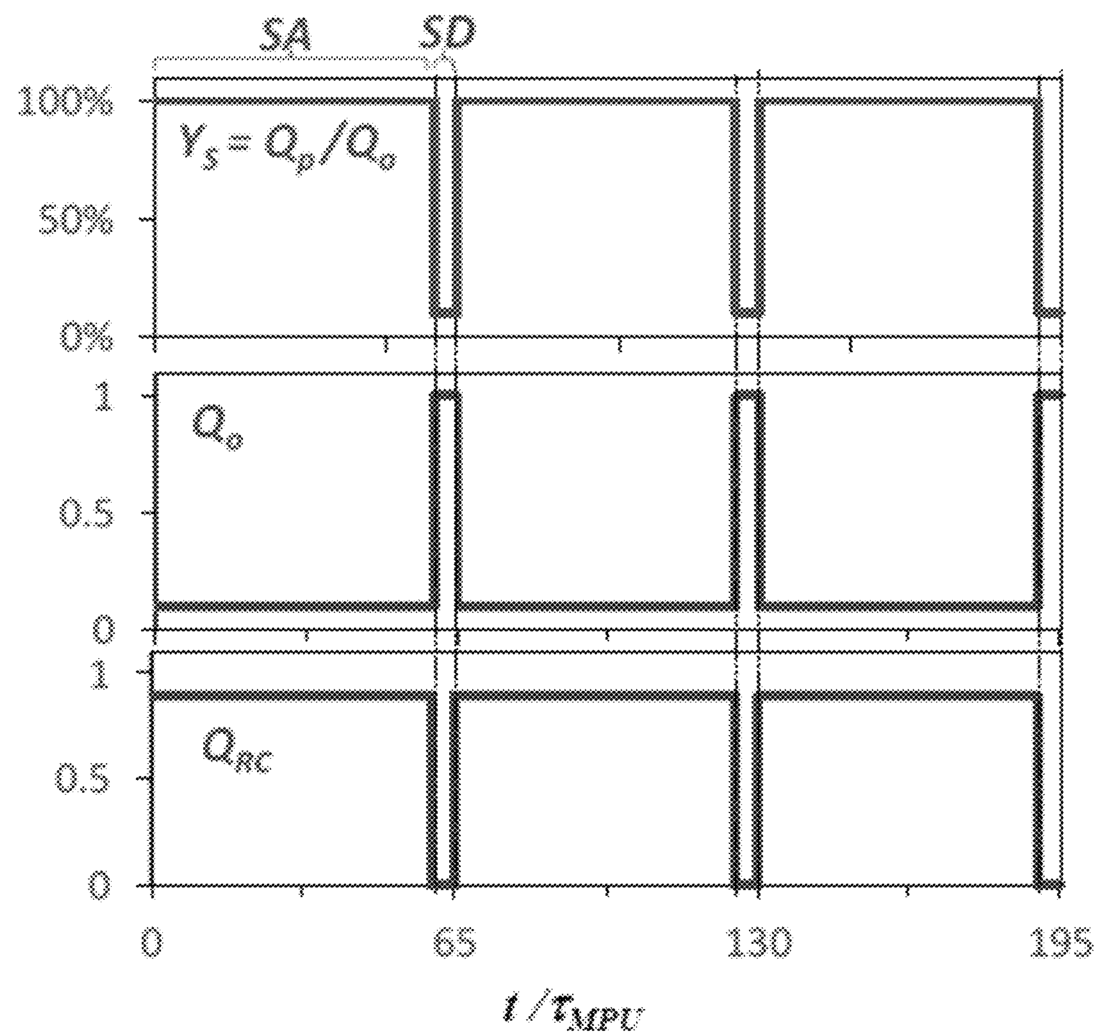
FIG. 9. Instantaneous system product recovery ($Y_S$) and dimensionless raw inlet and recycled concentrate flow rates during cyclic operation of a FLERO system, depicting solute accumulation (SA) and solute decumulation (SD) periods. The total duration of each cycle (relative to the fluid residence time in a MPU, $\tau_{MPU}$) is the sum of the SA and SD periods in the cycle. Flow rates are for operation of the FLERO system at $Y_{S,Lo}=Y_{MPU}=10\%$, $Y_{S,Hi}=100\%$, $Y_T=60\%$.
Figure 10:
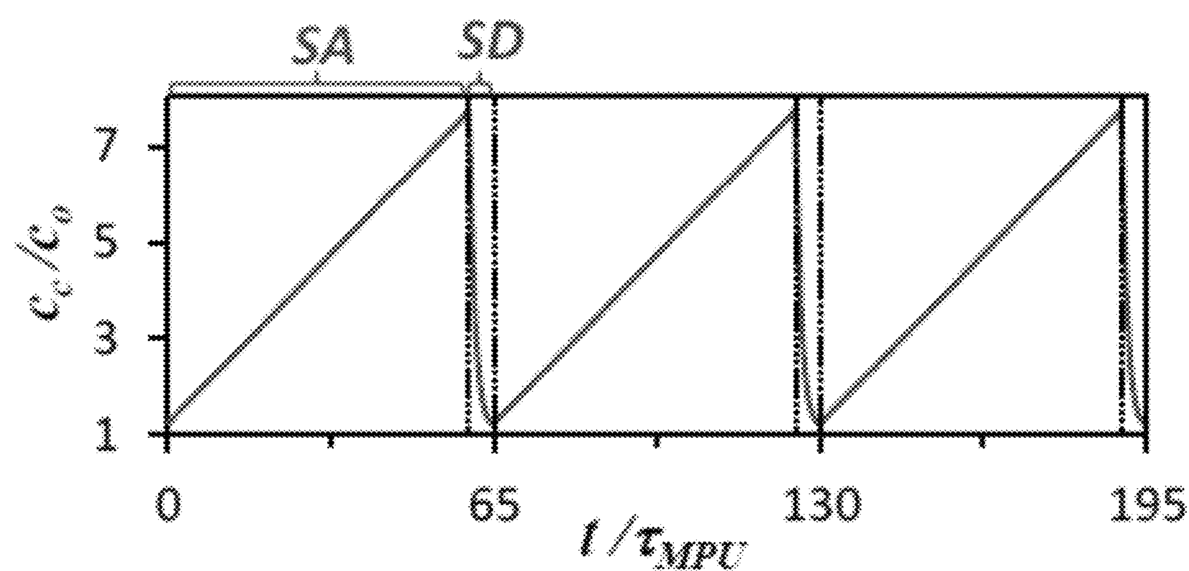
FIG. 10. Membrane array concentrate concentration ($C_c$, normalized to raw feed concentration $C_o$) during cyclic operation of a FLERO system, depicting solute accumulation (SA) and solute decumulation (SD) periods. The total duration of each cycle (relative to the fluid residence time in a MPU, $\tau_{MPU}$) is the sum of the SA and SD periods in the cycle. Time variant solute concentration is for operation of the FLERO system at $Y_{S,Lo}=Y_{MA}=10\%$, $Y_{S,Hi}=100\%$, $Y_T=60\%$.

In addition to the capability of operating in a steady-state (SS) mode, a FLERO system is also capable of operating in a cyclic unsteady-state (CUS) mode. This is due to the ability to vary $Y_S$ on demand without affecting system productivity. The CUS mode allows controlled, cyclical changes of solute concentrations in a membrane array, which may be beneficial for retarding membrane fouling/mineral scaling. In the CUS mode, $Y_S$ is alternatingly varied between a high ($Y_{S,Hi}$) and a low value ($Y_{S,Hi}>Y_{S,Lo}\geq Y_{MPU}$) to create cycles, each composed of a period solute accumulation followed by a period of solute decumulation or purging (FIG. 8). Starting with the baseline value ($Y_S=Y_{MPU}$) when there is no concentrate recycling ($q_{rc}=0$), a shift of system operation into concentrate recycling ($0<q_{rc}\leq q_c$) reduces the raw inlet flow ($q_o$), shifting $Y_S=Y_{MPU}$ to the upper target value of $Y_{S,Hi}$ (e.g., FIG. 9). Unsteady-state solute accumulation (SA) ensues in the system for a prescribed time period ($t_{SA}$). Prior to reaching steady-state, a subsequent shift of $Y_S$ into a lower target value ($Y_{S,Hi}>Y_{S,Lo}\geq Y_{MPU}$) initiates an unsteady-state period ($t_{SD}$) of solute decumulation (SD). By alternating between SA and SD periods, cyclic unsteady-state operation is maintained for which the solute concentration of the MPU concentrate cycles between low and high values (FIG. 10).

Figure 11:
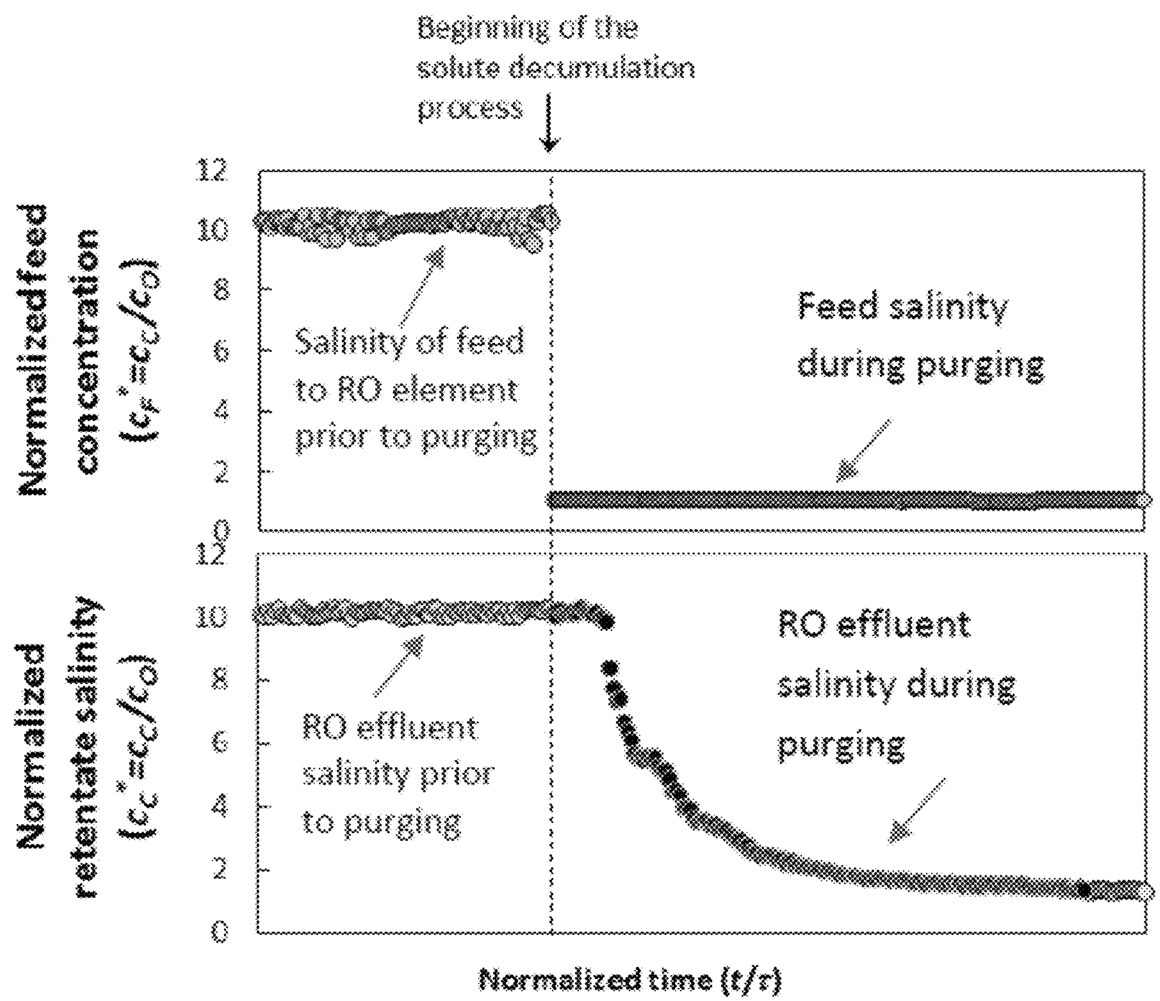
FIG. 11. Experimental data illustrating a salinity variation of a feed and a reverse osmosis (RO) effluent (or concentrate or retentate) streams during the transition from solute accumulation (SA) to solute decumulation (SD) periods. (Top) Salinity of the RO feed prior to purging (left of vertical dashed line) and during purging (right of the vertical dashed line). (Bottom) Salinity of the RO effluent prior to purging (left of vertical dashed line) and during purging (right of vertical dashed line). Note: $\tau$ is a convective residence time in a membrane retentate channel and $c_o$ is a raw feed salinity.

A duration of a time period of solute decumulation ($t_{SD}$) impacts the performance of FLERO operation during the CUS mode. Depending on the specific system design and operating conditions of the FLERO system, $t_{SD}$ is desirably optimized or adjusted in real-time to minimize or reduce a volume of raw feed water for purging the concentrate from membrane modules at the end of each cycle. Because of solute dispersion at a feed-concentrate interface during concentrate purging, an optimal $t_{SD}$ may vary significantly, depending on a geometry and hydrodynamics of a specific membrane retentate channel and in system components. Increasing extent of dispersion leads to a larger specified raw feed water volume for concentrate purging (FIG. 11), which would increase an energy consumption for permeate water production.

Figure 12:
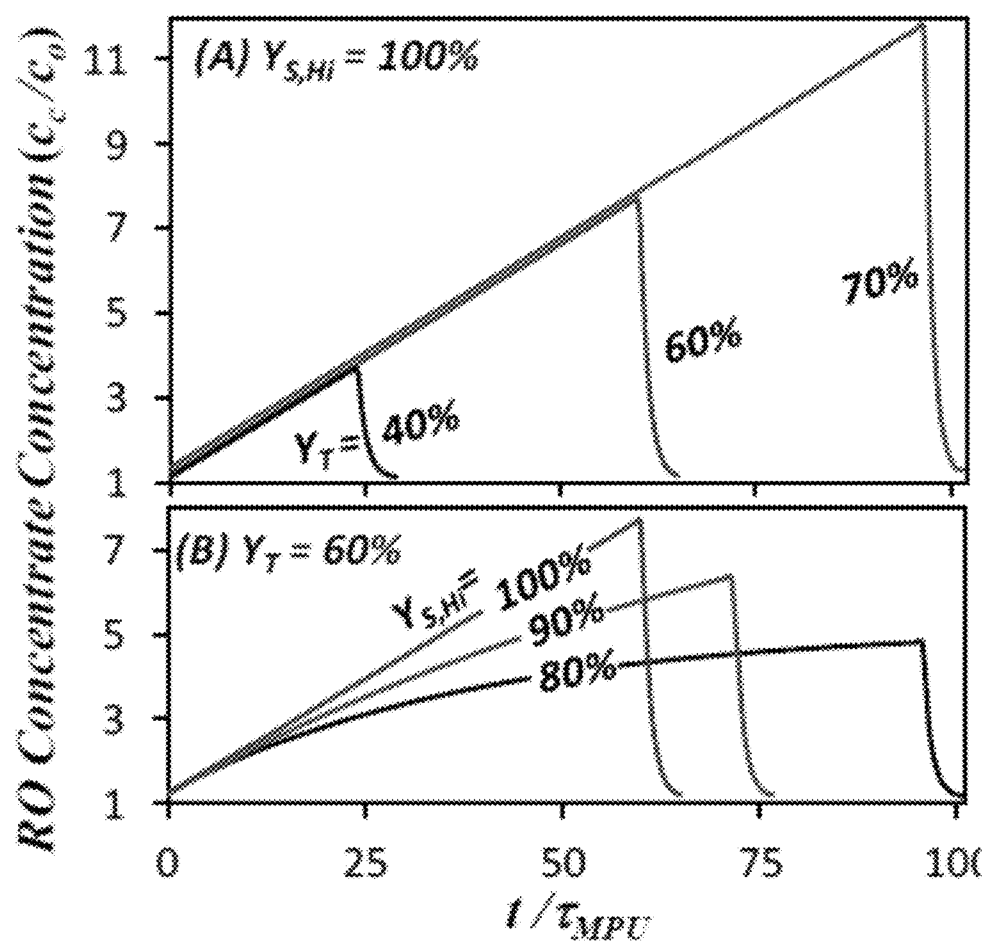
FIG. 12. Membrane array concentrate concentration ($c_c$, normalized to raw feed concentration $c_o$) during cyclic operation of a FLERO system, depicting the impact of varying (a) a total recovery ($Y_T$) and (b) an upper limit of system recovery ($Y_{S,Hi}$) during a solute accumulation period. The time variant concentration profile is based on unsteady-state solute mass balance of the FLERO system. The lower limit of system recovery is set at $Y_{S,Lo}=Y_{MA}=10\%$, and where $\tau_{MPU}$ designates the fluid residence time in the MPU.

A total product recovery ($Y_T$=total product volume/total feed volume per cycle) in the CUS mode is calculated differently than in the steady-state (SS) mode. In the SS mode, the system product recovery ($Y_S=q_p/q_o$) is time invariant and corresponds to $Y_T$. In contrast, $Y_T$ in the CUS mode lies in between the upper and low target $Y_S$ values ($Y_{MPU}\leq Y_{S,Lo}<Y_T<Y_{S,Hi}\leq 1$), which depends on the raw feed flow ($q_o$) during the SA and SD periods:

$$Y_T = \frac{q_{p,sp}\cdot t_{Cyc}}{q_{o,SA}\cdot t_{SA} + q_{o,SD}\cdot t_{SD}} \tag{1.5}$$

where the cycle duration is $t_{Cyc}=t_{SA}+t_{SD}$. The total product recovery in the CUS mode is given by:

$$Y_T = \frac{Y_{S,Lo}}{1-(1-Y_{S,Lo}/Y_{S,Hi})\cdot\theta_{SA}} \tag{1.6}$$

where $\theta_{SA}=t_{SA}/t_{Cyc}$ is the fractional duration within a cycle that the system is in the SA period. Thus, $Y_T$ in the CUS mode can be controlled by three variables: $Y_{S,Hi}$, $Y_{S,Lo}$, and $\theta_{SA}$. For example, a widest range of controlled variation in MPU concentrate solute concentration, which can be desirable to retard membrane fouling/mineral scaling, can be imparted in the FLERO system's membrane array by setting $Y_{S,Lo}$ and $Y_{S,Hi}$ at the minimum and maximum values of $Y_S=Y_{MPU}$ and $Y_S$=100%, respectively (e.g., see FIGS. 9-10 for $Y_T$=60%). In this case, $Y_T$ can be varied by regulating the fractional duration of the SA period ($\theta_{SA}$, see FIG. 12(A)). Nevertheless, operating the CUS mode with $Y_{S,Hi}$ at 100%, depending on the fluid residence time in the MPU, can lead to rapid increase in solute concentration and thus osmotic pressure, which may cause system over-pressurization at high $Y_T$. The high flexibility of the FLERO system allows for adjustment of $Y_{S,Hi}$<100% in order to lower the RO concentrate solute concentration rising rate and its maximum value in a cycle (FIG. 12(B)). When $Y_{S,Hi}$ is decreased below 100%, the target $Y_T$ is achieved with increasing $\theta_{SA}$ (see FIG. 12(B)). When the CUS mode is no longer desired, the FLERO system can return to the SS mode of operation on demand (meeting objective 3)).

Figure 13:
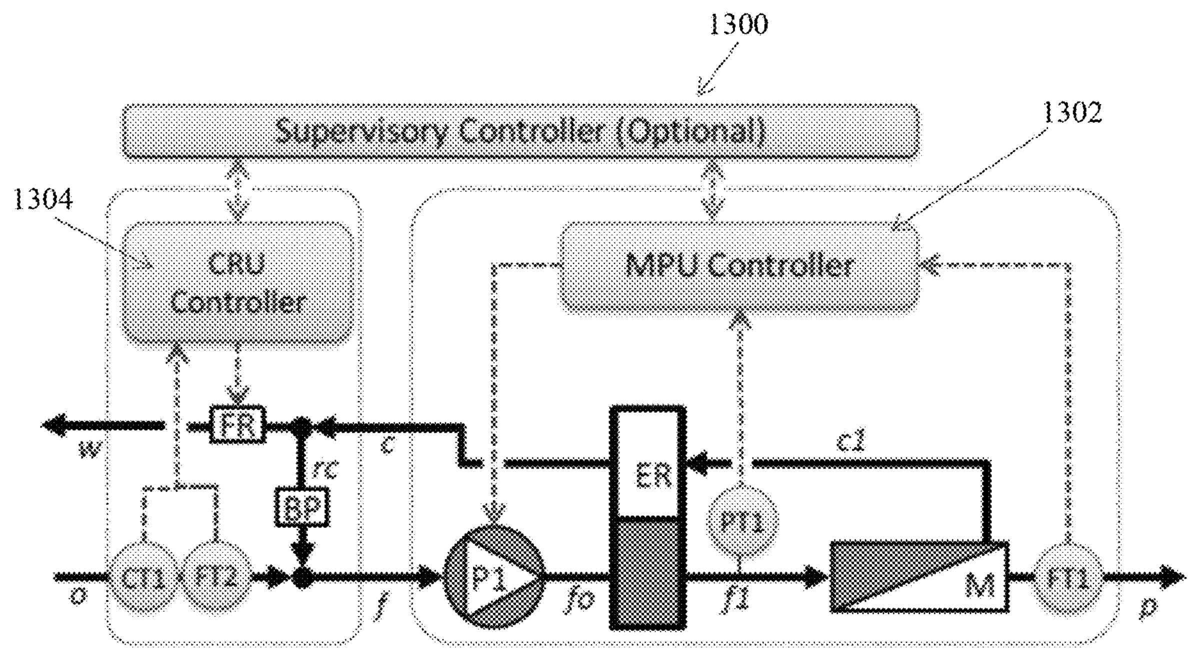
FIG. 13. Example control approaches for the FLERO system shown in FIG. 3, composed of two distinct controllers for the MPU and the CRU. Components: P1—feed pump, M—membrane subunit, ER—energy recovery device, FR—flow regulator, BP—backflow preventer. Sensors: CT—solute concentration/conductivity, FT—flow rate, PT—pressure. Streams: o—raw feed, f—feed, c—concentrate, p—permeate, b—brine waste, rc—recycled concentrate.
Figure 14:
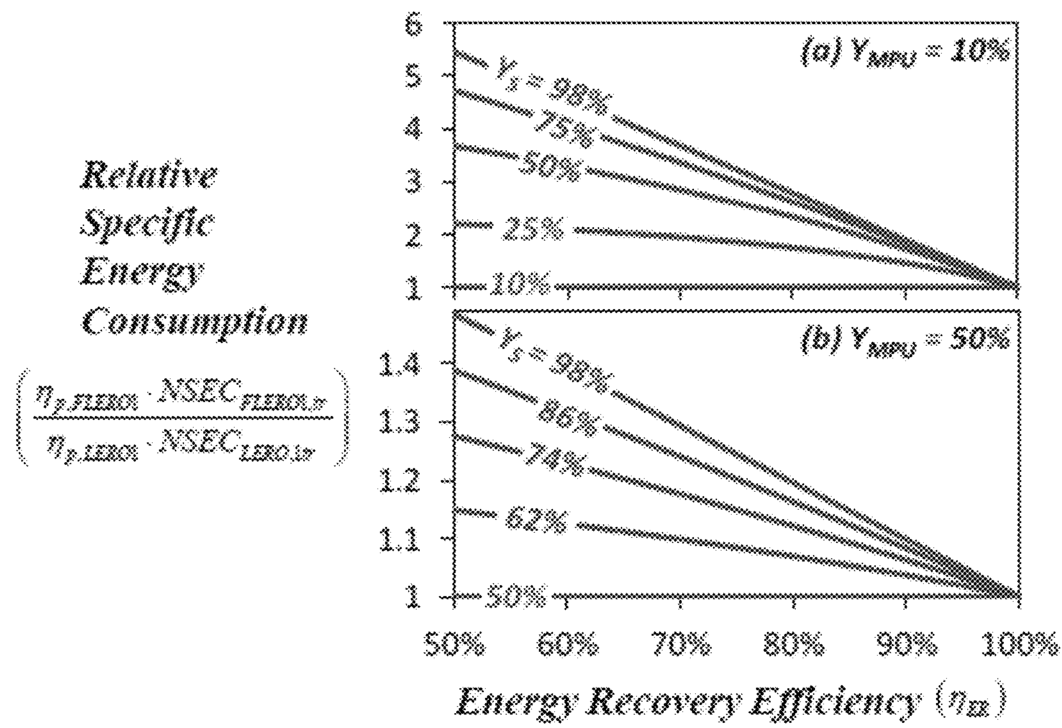
FIG. 14. Comparison of NSEC of FLERO with comparative low energy RO (LERO) at the limit of thermodynamic restriction for the case of fixed FLERO $Y_{MPU}$ of 10% (a) and 50% (b) as a function of energy recovery device efficiency and system product recovery ($Y_S$).

Automated process control can be implemented in a FLERO system, and is facilitated by decoupling the control of liquid purification and that of system product recovery. By design, the FLERO system allows a MPU stream to operate at the design flow rates regardless of a system water recovery ($Y_S$). The process control objective of a MPU can thus be focused on disturbance rejection in maintaining substantially constant product flow rate ($q_p=q_{p,sp}$) and MPU product recovery level ($Y_{MPU}$) at design set-points. Common disturbances include, but are not limited to, changes in solute concentrations (and thus osmotic pressure) in a membrane array due to controlled changes in $Y_S$ (by a CRU) or uncontrolled changes in a raw feed solute concentration, as well as uncontrolled changes in stream temperature and membrane water permeability. The process control objective of the CRU can be focused on concentrate flow splitting (for concentrate recycling) to regulate the system product recovery ($Y_S$) based on measurements of the solute concentration in the raw feed stream. In principle, MPU and CRU controllers 1302 and 1304 can be completely independent. Nevertheless, an optional supervisory controller 1300 may be beneficial to ensure any fault conditions (e.g., over-pressurization, rapid membrane fouling/scaling, faulty components, and so forth) detected by the MPU controller 1302 are communicated (for corrective actions) to the CRU controller 1304 and vice versa, as well as to allow real-time overall system optimization and fault prediction. In other embodiments, two or more of the controllers 1300, 1302, and 1304 may be combined in a single controller. The controllers 1300, 1302, and 1304 can be implemented in hardware (e.g., an application-specific integrated circuit, an embedded controller or a microcontroller), or a combination of hardware and software (e.g., a processing unit connected to a memory or other computer-readable storage medium storing instructions or computer code executable by the processing unit). As an illustration (see FIG. 13), the FLERO system depicted in FIG. 3 can be considered in which a pressure intensifier is utilized as an energy recovery device. Typically, pressure intensifiers mechanically fix a ratio between feed-side ($q_f$) and concentrate-side ($q_c$) flow rates, thereby mechanically restricting the MPU product recovery level ($Y_{MPU}=1-q_c/q_f$). Thus, the regulatory control in the MPU is feed-back control of $q_p$ at $q_{p,sp}$ (the control variable) using the variable frequency drive (the manipulated variable) of the main pump motor (P1). Pressure measurement of the high pressure feed in the MPU, using a pressure sensor (PT1), is warranted to detect impending system over-pressurization and allow corrective action. In the CRU, the system product recovery ($Y_S=q_{p,sp}/q_o$) is regulated by controlling the raw feed flow rate ($q_o$, the control variable) using a flow regulator (e.g., valve, the manipulated variable). Measurements of raw inlet stream concentration, using a solute concentration sensor (CT1), can be utilized, for example, for automatic prediction of an appropriate $Y_S$ set point on the basis of maximum allowable solute concentration to avoid system over-pressurization and/or rapid membrane fouling/scaling.

Advantages

Embodiments of this disclosure address the demand for membrane-based liquid purification and desalination systems that, using a single-system platform, have both high operational flexibility and high energy efficiency. Embodiments are applicable to water treatment and desalination via nanofiltration (NF) or reverse osmosis (RO) processes, although other membrane-based liquid separation processes and applications may also be implemented. Implementation for water treatment and desalination via RO (e.g., FLERO), for example, can address the following, but not limited to, demands and provide one or more of the following advantages.

a) A FLERO system can significantly enhance the applicability of energy recovery devices. High-efficiency energy recovery devices can reduce the costs of seawater desalination to unprecedented levels. However, current commercially available energy recovery devices can have a limited operational range to be effective for a wider range of applications (e.g., brackish water, wastewater, and so forth), limiting applicability of high-efficiency energy recovery devices to primarily seawater desalination applications at narrow operational ranges. Specifically, for a given type and size of an energy recovery device, high energy transfer efficiency operation is typically limited to narrow feed- and concentrate-side flow ranges. The ratio of feed- and concentrate-side flow rates is also mechanically fixed in various small energy recovery devices because of their principle of operation. Consequently, integration of commercially available energy recovery devices into other RO/NF systems is rendered practical if a system water recovery is kept at a narrow range or, in many small-scale applications, completely fixed. In contrast, the FLERO system allows optimal operation of an energy recovery device, while at the same time allowing highly flexible adjustments of system water recovery range to address a wide range of applications. This is because, unlike other systems, an energy recovery device in the FLERO system is integrated in a non-flow-varying MPU, while system operational flexibility is provided by a separate CRU.

b) The FLERO system is effective for mobile water treatment/desalination. This application involves the ability for a single-system platform to treat a wide variety of source waters (with respect to solute composition and concentrations). However, the optimal system water recovery level is source water specific. The ability to vary the system water recovery over a wide range is therefore desired to be able to treat a wide range of source waters (from low-salinity, contaminated water to brackish water and seawater). Unlike the FLERO system, the water recovery ranges in other mobile systems are typically narrow due to restrictions imposed by membrane array designs (see objective 1) above).

c) The FLERO system can allow water treatment/desalination using renewable energy such as solar, wind, or both. This application specifies a small energy footprint, which can be attained in most cases when energy recovery devices are utilized, pumps are operated at the best efficiency points, and membrane arrays are operated close to the thermodynamic limits. Unlike other systems, the FLERO system can have a small energy footprint to allow utilization of renewable energy without sacrificing operational flexibility.

d) The FLERO system allows high recovery, energy-efficient water treatment/desalination in small-scale applications. Using commercial membrane modules, high water recovery is feasible with i) multiple membrane modules arranged in series (see FIG. 2) or ii) concentrate recycling. Because commercial membrane modules are available in standard sizes, the number of serially-arranged membrane modules to attain high water recovery levels can be significant (e.g., up to 14 membrane modules in series to attain 75% water recovery) and may be unsuitable (e.g., oversized) for small-scale applications. Other approaches for concentrate recycling can be utilized to allow high product water recovery, but is not energy efficient as no energy recovery is utilized. FLERO is an approach which can utilize as little as a single membrane module while still capable of achieving high product water recovery levels (e.g., up to >about 90%) and maintaining energy consumption low.

e) The FLERO system is effective for treatment/desalination of challenging water sources. Such sources include source waters with high tendency for membrane fouling/mineral scaling, as well as with high variability in feed water salinity. The FLERO system is suitable for this application because of its ability to flexibly vary the steady-state system water recovery to adapt to feed water salinity and fouling/mineral scaling tendency, as well as the ability to operate in cyclic unsteady-state mode of operation. Other approaches lack the level of combined flexibility and energy efficiency that the FLERO system can provide.

f) The FLERO system can be implemented as a retrofit to another system for performance improvement. Retrofitting systems via the FLERO approach can be desirable to increase system recovery range beyond an original system design limit, which can reduce both feed pretreatment (due to lower raw feed flow rate, $q_o$) and concentrate treatment costs (due to lower concentrate waste flow rate, $q_w$). Other RO systems that utilize energy recovery and operate at relatively low water recovery can be retrofitted via FLERO. This is attained with another system serving as a MPU and by integrating a separate CRU.

EXAMPLE

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

Stage of Development i. The principles of operation have been developed and analysis conducted to identify advantages and provide the basis for a FLERO system and its operational methods.

ii. A prototype FLERO system has been designed, constructed, and operated.

iii. A control system for FLERO, including its procedures and software, has been designed and implemented.

iv. FLERO operation in steady-state mode has been demonstrated (seawater and groundwater).

v. FLERO operation in cyclic unsteady-state mode has been demonstrated (seawater and groundwater).

Results

Figure 15:
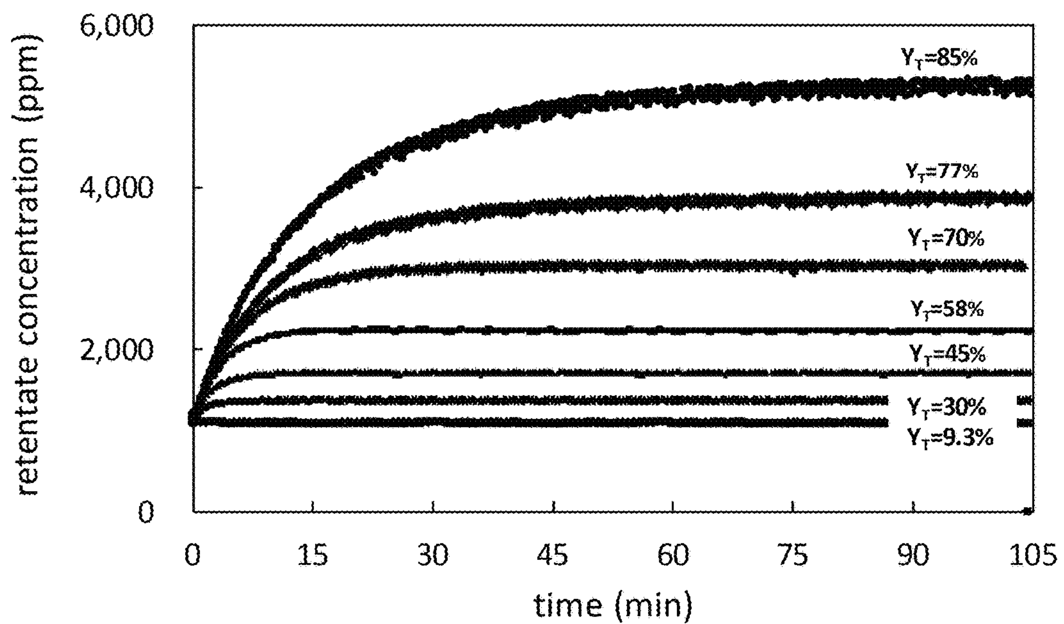
FIG. 15. Steady-state experiment at various water recovery target levels. Curves reflect transient profile of retentate concentration until FLERO process reaches steady-state over a wide range of system water recovery levels. Membrane: XLE2540 Dow Filmtech, permeate flow rate: 0.275 gallons per minute (gpm).

FIG. 15 shows results of a steady-state experiment at various water recovery target levels. Curves reflect transient profile of retentate concentration until FLERO process reaches steady-state at various system water recovery levels. The various steady-state water recovery levels were attained by regulating the recycled concentrate flow rate ($Q_{RC}$) per Equation 1.1.

Figure 16:
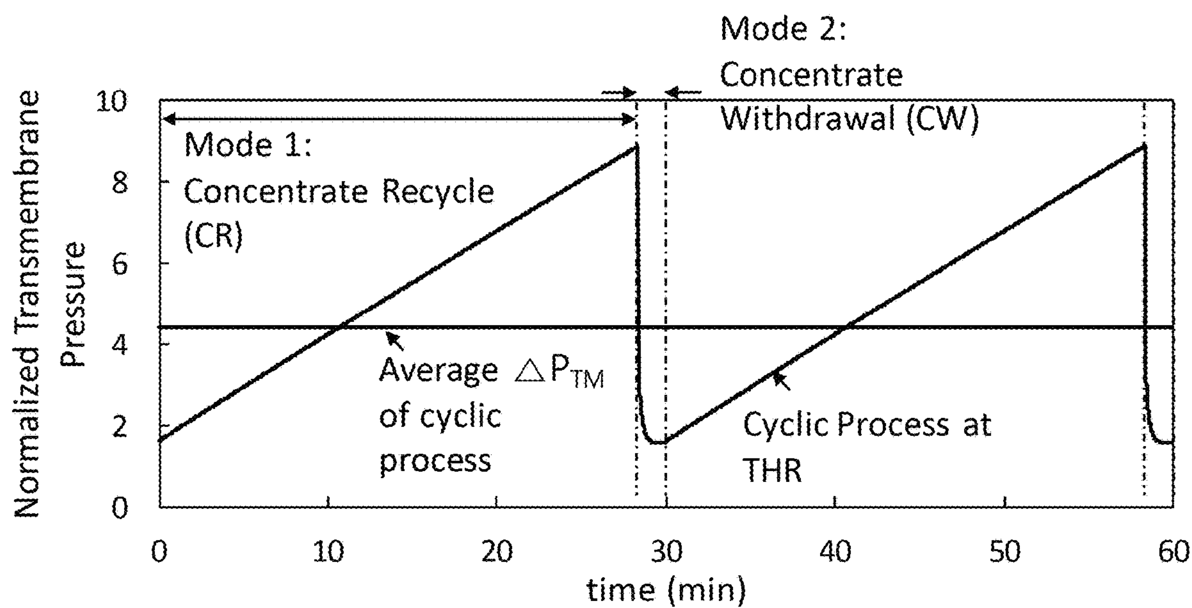
FIG. 16. Cyclic unsteady-state experiment. A two-stage RO process includes concentrate recycle (CR) and concentrate withdrawal (CW) operational periods. Curve reflects a profile of normalized transmembrane pressure as a function of time.
Figure 17:
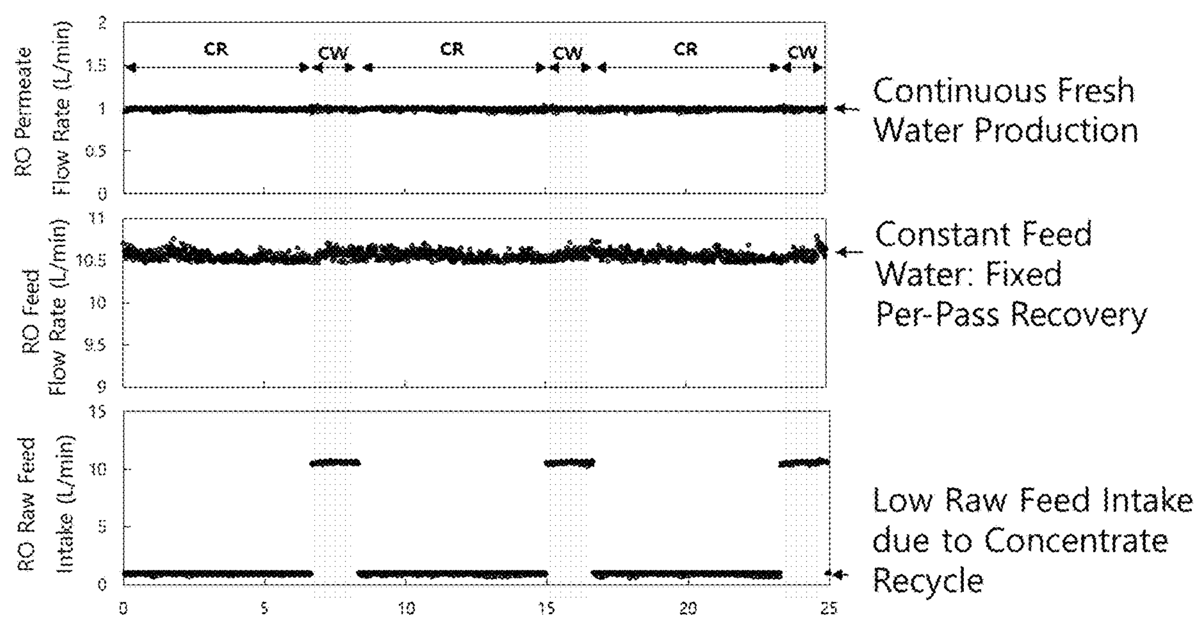
FIG. 17. Cyclic unsteady-state experiment. A two-stage RO process includes CR and CW operational periods. Curves in FIG. 17 reflect profiles of RO permeate flow rate, RO feed flow rate, and raw feed flow rate.

FIGS. 16 and 17 show results of a cyclic unsteady-state experiment. A two-stage RO process includes (1) concentrate recycle (CR) and (2) concentrate withdrawal (CW) operational periods. Curve in FIG. 16 reflects a profile of normalized transmembrane pressure as a function of time. Curves in FIG. 17 reflect profiles of RO permeate flow rate, RO feed flow rate, and raw feed flow rate as a function of time. As can be observed, the RO permeate flow rate and RO feed flow rate remain substantially fixed over cycles of CR and CW periods, while the raw feed flow rate undergoes stepwise changes.

Figure 18:
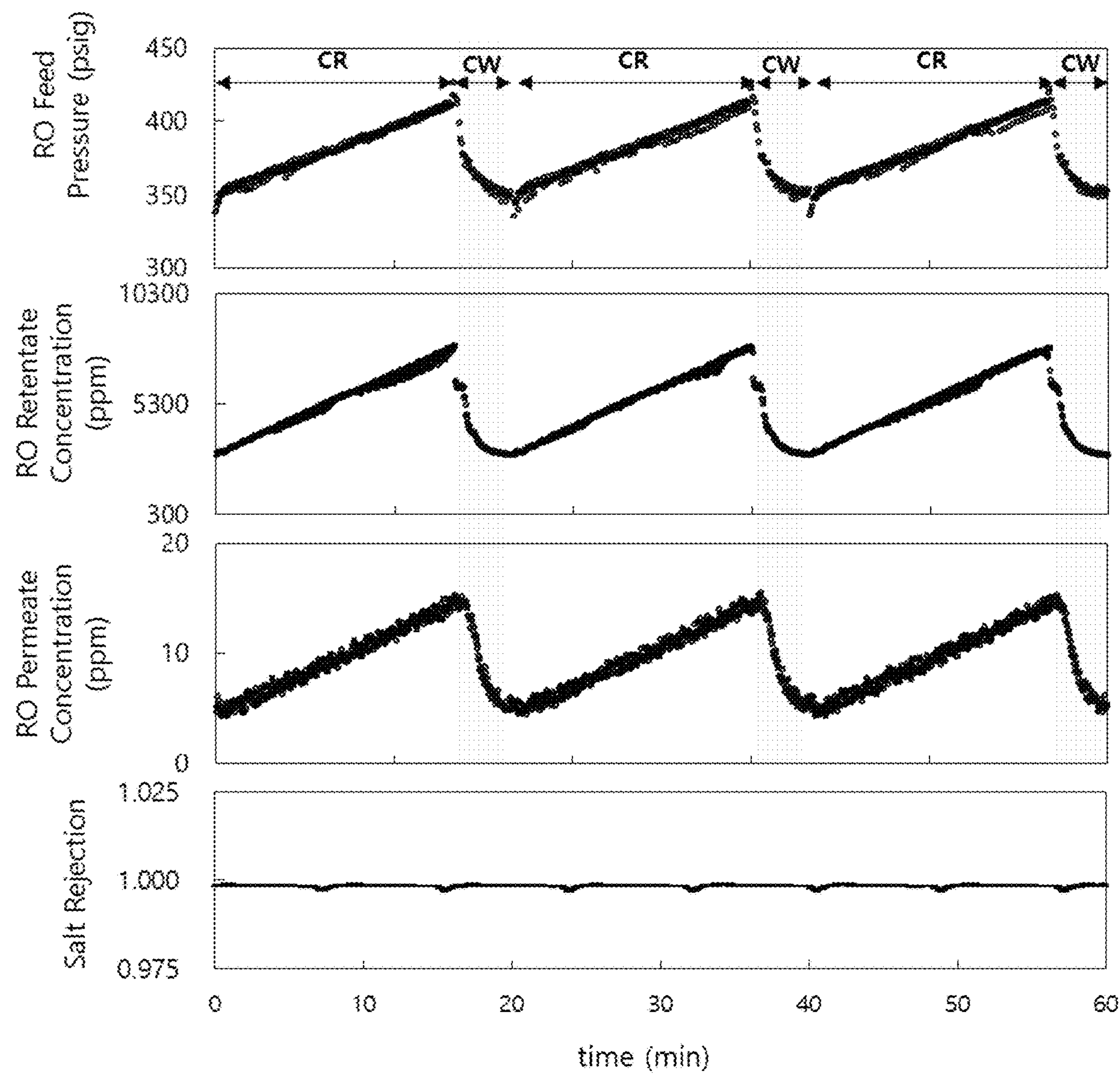
FIG. 18. Cyclic unsteady-state experiment. A two-stage RO process includes CR and CW operational periods. Curves in FIG. 18 reflect profiles of RO feed pressure (pounds per square inch gauge (psig)), RO retentate concentration (parts per million (ppm)), RO permeate concentration (ppm), and salt rejection as a function of time.

FIG. 18 shows results of a cyclic unsteady-state experiment. In this operational mode, each cyclic RO process cycle includes a series of (1) concentrate recycle (CR) and (2) concentrate withdrawal (CW) operational periods. Curves in FIG. 18 reflect profiles of RO feed pressure (pounds per square inch gauge (psig)), RO retentate concentration (parts per million (ppm)), RO permeate concentration (ppm), and salt rejection as a function of time. Due to increasing osmotic pressure, the profile of the feed pressure largely follows the RO retentate concentration profiles. The concentration profiles in both CR and CW periods match well with mass balance predictions: CR: substantially linear growth, CW: substantially exponential-like decay.

Figure 19:
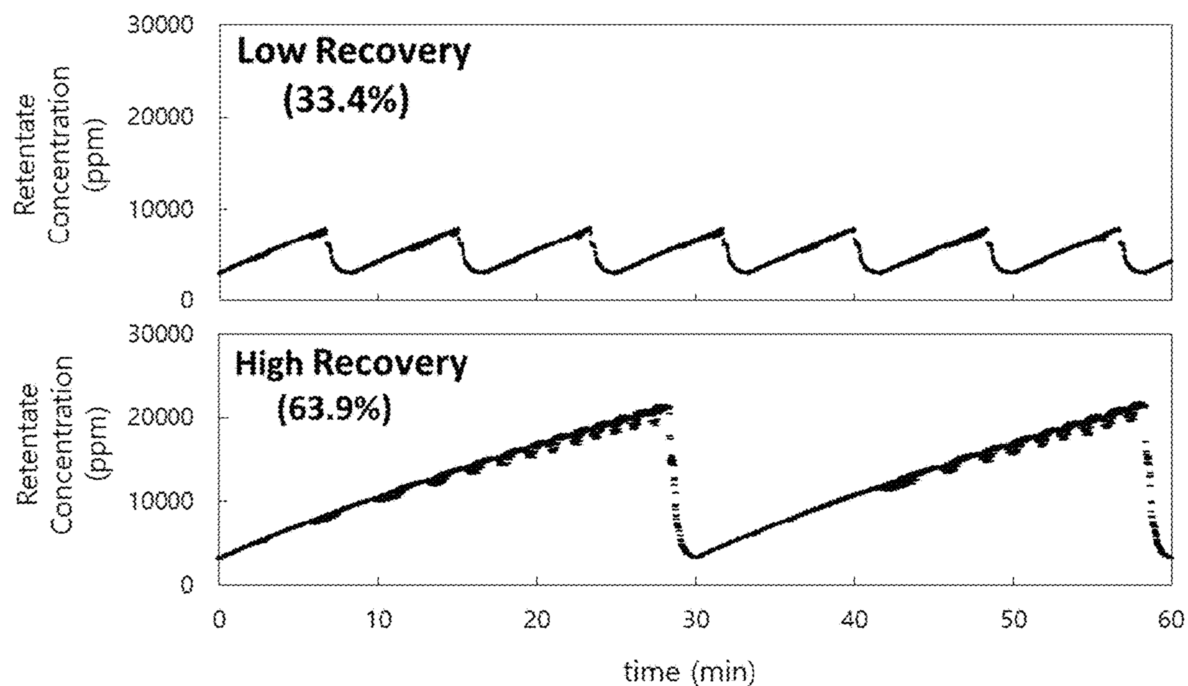
FIG. 19. Cyclic unsteady-state experiment. Curves in FIG. 19 reflect profiles of retentate concentration (ppm) as a function of time for a low system water recovery level (33.4%) and a high system water recovery level (63.9%).
Figure 20:
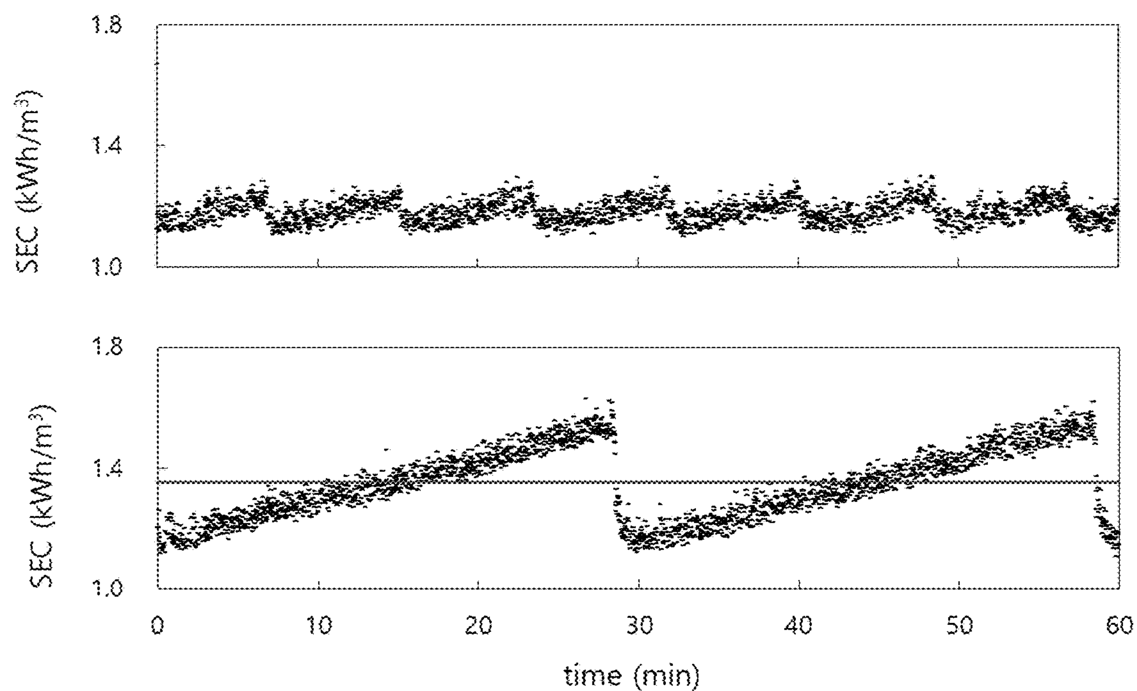
FIG. 20. Cyclic unsteady-state experiment. Curves in FIG. 20 reflect profiles of specific energy consumption (SEC) ($kWh/m^3$) as a function of time for a low system water recovery level (33.4%) and a high system water recovery level (63.9%).

FIGS. 19 and 20 show results of a cyclic unsteady-state experiment. Curves in FIG. 19 reflect profiles of retentate concentration (ppm) as a function of time for a low system water recovery level (33.4%) and a high system water recovery level (63.9%). Concentrate recycle period is extended to attain the high system water recovery level. Curves in FIG. 20 reflect profiles of specific energy consumption (SEC) ($kWh/m^3$) as a function of time for the low system water recovery level (33.4%) and the high system water recovery level (63.9%). Average energy consumption across cycles is higher with the high system water recovery level.

Figure 21:
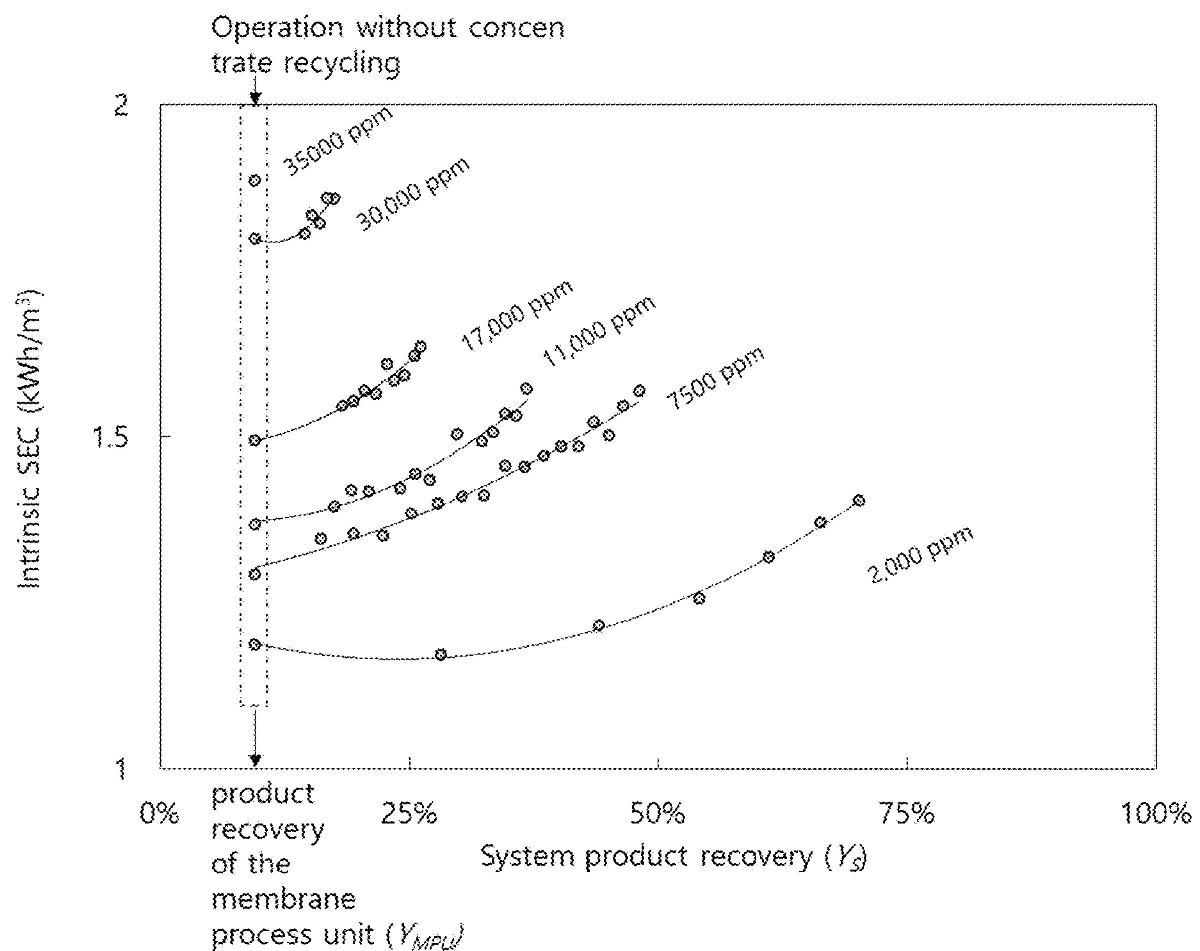
FIG. 21. Intrinsic SEC ($kWh/m^3$) as a function of system water recovery level, where the intrinsic SEC is given by a product of SEC and a pump efficiency. Different curves in FIG. 21 correspond to different solute concentrations.

FIG. 21 shows intrinsic SEC ($kWh/m^3$) as a function of system water recovery level, where the intrinsic SEC is given by a product of SEC and a pump efficiency. Different curves in FIG. 21 correspond to different solute concentrations. For low salinity water, a wide range of system water recovery levels can be attained. The flexibility of the FLERO system provides the ability to optimize RO recovery depending on feed water.

As used herein, the singular terms “a,” “an,” and “the” may include plural referents unless the context clearly dictates otherwise. Thus, for example, reference to an object may include multiple objects unless the context clearly dictates otherwise.

As used herein, the term “set” refers to a collection of one or more objects. Thus, for example, a set of objects can include a single object or multiple objects.

As used herein, the terms “substantially,” “substantial,” and “about” are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, by referring to a quantity or parameter as substantially constant or fixed, the term can refer to a range of variation of less than or equal to ±10% of an average value of that quantity or parameter, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the terms “connect,” “connected,” “connecting,” and “connection” refer to an operational coupling or linking. Connected objects can be directly coupled to one another or can be indirectly coupled to one another, such as through another set of objects.

Some embodiments of the disclosure relate to a non-transitory computer-readable storage medium having computer code thereon for performing various computer-implemented operations. The term “computer-readable storage medium” is used herein to include any medium that is capable of storing or encoding a sequence of executable instructions or computer codes for performing the operations, methodologies, and techniques described herein. The media and computer code may be those specially designed and constructed for the purposes of embodiments of this disclosure, or they may be of the kind available to those having skill in the computer software arts. Examples of computer-readable storage media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs), and ROM and RAM devices. Examples of computer code include machine code, such as produced by a compiler, and files containing higher-level code that are executed by a computer using an interpreter or a compiler. For example, an embodiment of the disclosure may be implemented using Java, C++, or other object-oriented programming language and development tools. Additional examples of computer code include encrypted code and compressed code. Moreover, an embodiment of the disclosure may be downloaded as a computer program product, which may be transferred from a remote computer (e.g., a server computer) to a requesting computer (e.g., a client computer or a different server computer) via a transmission channel. Another embodiment of the disclosure may be implemented in hardwired circuitry in place of, or in combination with, machine-executable software instructions.

Additionally, concentrations, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a range of about 1 to about 200 should be understood to include the explicitly recited limits of about 1 and about 200, but also to include individual values such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not a limitation of the disclosure.

What is claimed is:

1. A liquid purification system comprising:

a membrane process unit configured to receive a feed stream, perform membrane-based purification of the feed stream to generate a product stream and a concentrate stream, and subject the concentrate stream to energy recovery to provide at least a portion of energy for membrane-based purification of the feed stream; and a concentrate recycle unit fluidly connected to the membrane process unit, the concentrate recycle unit configured to receive the concentrate stream from the membrane process unit, split the concentrate stream into a waste stream and a recycled concentrate stream in regulated proportions without dilution, purification, or further concentration, and combine the recycled concentrate stream with a raw feed stream to generate the feed stream which is supplied to the membrane process unit, wherein the concentrate recycle unit includes a concentrate recycle unit controller to direct operation of the concentrate recycle unit, the concentrate recycle unit controller includes a first processing unit and a first memory storing instructions executable by the first processing unit to vary, in the concentrate recycle unit, at least one of a flow rate of the raw feed stream, a flow rate of the waste stream, or a flow rate of the recycled concentrate stream, and maintain a flow rate of the feed stream substantially fixed.

2. The liquid purification system of claim 1, wherein the membrane process unit includes a membrane array, a feed pump fluidly connected to the membrane array, and an energy recovery device which is fluidly connected in series or in parallel with the feed pump.

3. The liquid purification system of claim 1, wherein the membrane process unit includes a reverse osmosis membrane array or a nanofiltration membrane array.

4. The liquid purification system of claim 1, wherein the membrane process unit includes a membrane process unit controller to direct operation of the membrane process unit.

5. The liquid purification system of claim 4, wherein the membrane process unit controller includes a second processing unit and a second memory storing instructions executable by the second processing unit to maintain each of a flow rate of the product stream and a flow rate of the concentrate stream as substantially fixed.

6. The liquid purification system of claim 1, wherein the first memory stores instructions executable by the first processing unit to regulate a ratio of the flow rate of the recycled concentrate stream relative to the flow rate of the feed stream entering the membrane process unit in order to achieve and maintain a target steady-state product recovery level of the liquid purification system, specified as a ratio of a flow rate of the product stream relative to the flow rate of the raw feed stream.

7. The liquid purification system of claim 1, wherein the first memory stores instructions executable by the first processing unit to direct variation of a ratio of the flow rate of the raw feed stream relative to the flow rate of the feed stream within a range of values equal to or smaller than unity.

8. The liquid purification system of claim 7, wherein the first memory stores instructions executable by the first processing unit to direct the variation with time in a stepwise or a cyclical manner.

9. The liquid purification system of claim 7, wherein the first memory stores instructions executable by the first processing unit to:

direct operation of the concentrate recycle unit in multiple cycles each including a solute accumulation period and a solute decumulation period, increase the flow rate of the recycled concentrate stream during the solute accumulation period, and decrease the flow rate of the recycled concentrate stream during the solute decumulation period.

10. The liquid purification system of claim 9, wherein, for an initial cycle, the solute decumulation period has a duration, and the first memory stores instructions executable by the first processing unit to vary the duration of the solute decumulation period to provide solute purging from the liquid purification system while reducing a volume of the raw feed stream for solute purging in at least one subsequent cycle.

11. The liquid purification system of claim 1, wherein an integration of the membrane process unit, including an energy recovery device, with the concentrate recycle unit provides a single-system platform to operate at varying raw feed solute concentrations with an upper value of solute concentration and a product recovery level set by pressure ratings of system components.

12. The liquid purification system of claim 9, wherein the first memory stores instructions executable by the first processing unit to vary a duration of the solute accumulation period across the cycles.

* * * * *